US008514755B2

(12) United States Patent
Kawada

(10) Patent No.: US 8,514,755 B2
(45) Date of Patent: Aug. 20, 2013

(54) TRANSMITTING AND RECEIVING SYSTEM, TRANSMITTING APPARATUS, TRANSMITTING METHOD, RECEIVING APPARATUS, RECEIVING METHOD, AND PROGRAM

(75) Inventor: Masato Kawada, Tokyo (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 12/431,398

(22) Filed: Apr. 28, 2009

(65) Prior Publication Data

US 2009/0209213 A1    Aug. 20, 2009

Related U.S. Application Data

(62) Division of application No. 11/278,073, filed on Mar. 30, 2006, now Pat. No. 7,710,906.

(30) Foreign Application Priority Data

Apr. 20, 2005   (JP) ................................. 2005-122971

(51) Int. Cl.
  *H04B 7/00*   (2006.01)
(52) U.S. Cl.
  USPC ........... 370/310; 370/503; 370/508; 370/509; 370/350; 370/338
(58) Field of Classification Search
  None
  See application file for complete search history.

(56) References Cited

U.S. PATENT DOCUMENTS

| 7,142,864 | B2 * | 11/2006 | Laroia et al. ................... 455/450 |
| 7,221,686 | B1 * | 5/2007 | Belcea ........................... 370/509 |
| 7,388,845 | B2 * | 6/2008 | Laroia et al. ................... 370/311 |

(Continued)

FOREIGN PATENT DOCUMENTS

| JP | SHO 62-145963 | 6/1987 |
| JP | HEI 07-067175 | 3/1995 |

(Continued)

OTHER PUBLICATIONS

Japanese Office Action issued on Aug. 5, 2010 corresponding to Japanese Patent Appln. No. 2005-122971.

*Primary Examiner* — Rafael Perez-Gutierrez
*Assistant Examiner* — German Viana Di Prisco
(74) *Attorney, Agent, or Firm* — K&L Gates LLP

(57) ABSTRACT

A transmitting and receiving system is provided. The transmitting of receiving system includes a transmitting apparatus to transmit data and a receiving apparatus to receive the data by means of radio communication. The transmitting apparatus includes: data transmission means for transmitting the data; state information reception means for receiving state information indicative of states of the radio communication from the receiving apparatus; and control means for controlling transmission using the data transmission means. When the state information reception means receives state information indicating a degraded state of the radio communication, the control means stores control information for the data transmission means to control transmission immediately before the state information is received; and, when the state information reception means thereafter receives state information indicating a normal state of the radio communication, the control means uses the most recently stored control information to control transmission by means of the data transmission means. The receiving apparatus includes: data reception means for receiving data transmitted from the data transmission means by means of the radio communication; determination means for determining the radio communication state based on data received by the data reception means; and state information transmission means for transmitting state information indicating the radio communication state determined by the determination means to the transmitting apparatus.

7 Claims, 12 Drawing Sheets

(56) References Cited

U.S. PATENT DOCUMENTS

| | | | |
|---|---|---|---|
| 7,630,339 B2 * | 12/2009 | Laroia et al. | 370/330 |
| 2002/0172166 A1 * | 11/2002 | Arslan et al. | 370/317 |
| 2004/0095904 A1 * | 5/2004 | Laroia et al. | 370/329 |
| 2004/0229628 A1 * | 11/2004 | Khan | 455/452.2 |
| 2005/0213682 A1 * | 9/2005 | Han et al. | 375/267 |
| 2007/0189320 A1 * | 8/2007 | Wu et al. | 370/437 |

FOREIGN PATENT DOCUMENTS

| | | |
|---|---|---|
| JP | 2001-069093 | 3/2001 |
| JP | 2001-160824 | 6/2001 |
| JP | 2004-056734 | 2/2004 |
| JP | 2004-140726 | 5/2004 |
| JP | 2004-153616 | 5/2004 |
| JP | 2004-153619 | 5/2004 |
| JP | 2004-289621 | 10/2004 |
| JP | 2004-297565 | 10/2004 |
| JP | 2004-297742 | 10/2004 |
| JP | 2005-057633 | 3/2005 |
| JP | 2005-086304 | 3/2005 |
| JP | 2004-15761 | 8/2005 |
| JP | 2005-295283 | 10/2005 |

* cited by examiner

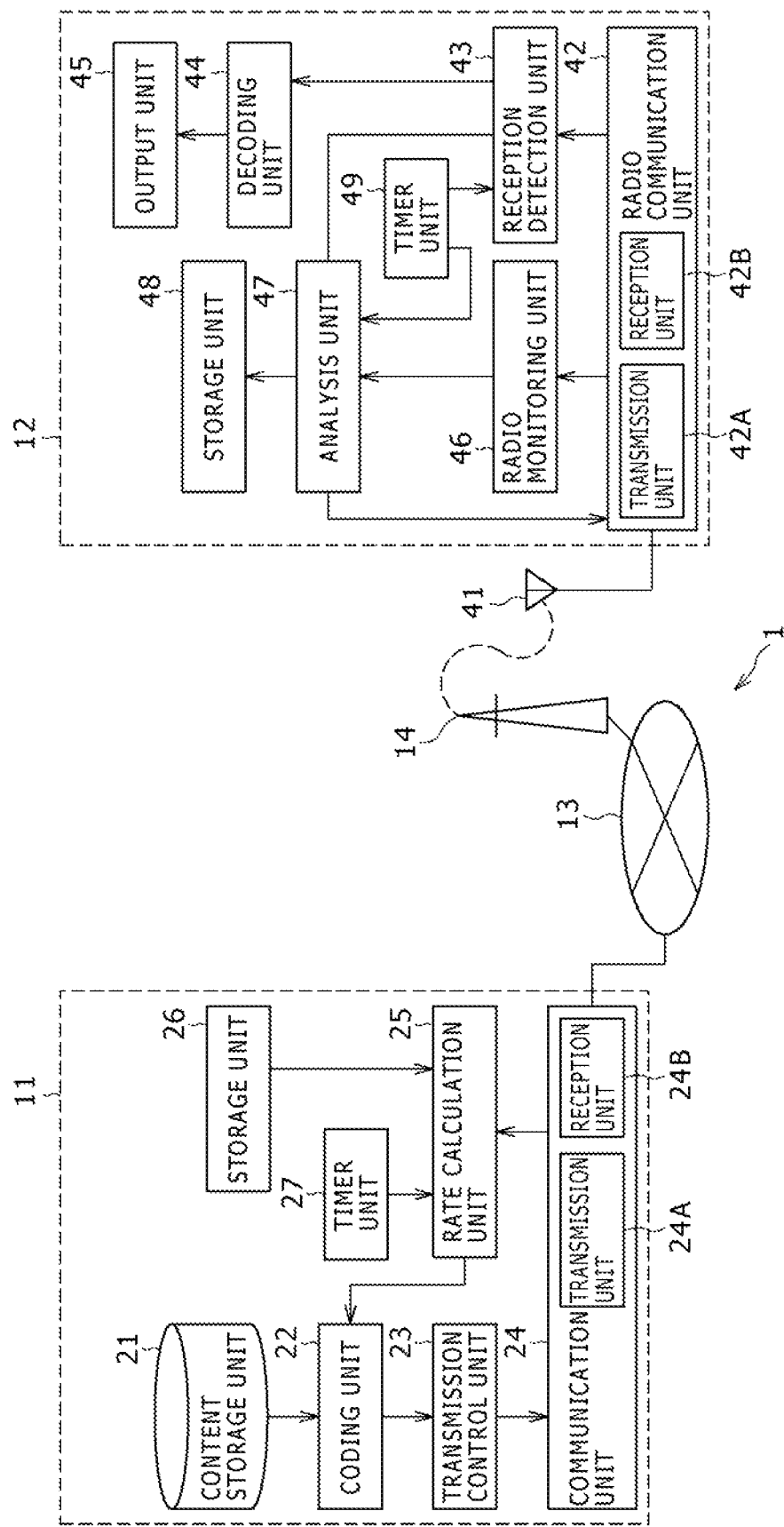

FIG. 4

| STATE S | DESCRIPTION | OPERATION |
|---|---|---|
| 0 | STABLE STATE : SMALL INSTANTANEOUS VALUE err AND SMALL MOBILE AVERAGE VALUE err_ave | PROVIDING WIRED CONGESTION CONTROL |
| 1 | MOMENTARILY DEGRADED STATE : LARGE INSTANTANEOUS VALUE err | SAVING RTT AND TRANSMISSION RATE AND PROVIDING WIRED CONGESTION CONTROL |
| 2 | CONTINUOUSLY DEGRADED STATE : LARGE MOBILE AVERAGE VALUE err_ave | PROVIDING TRANSMISSION RATE CONTROL CORRESPONDING TO RADIO SITUATIONS |

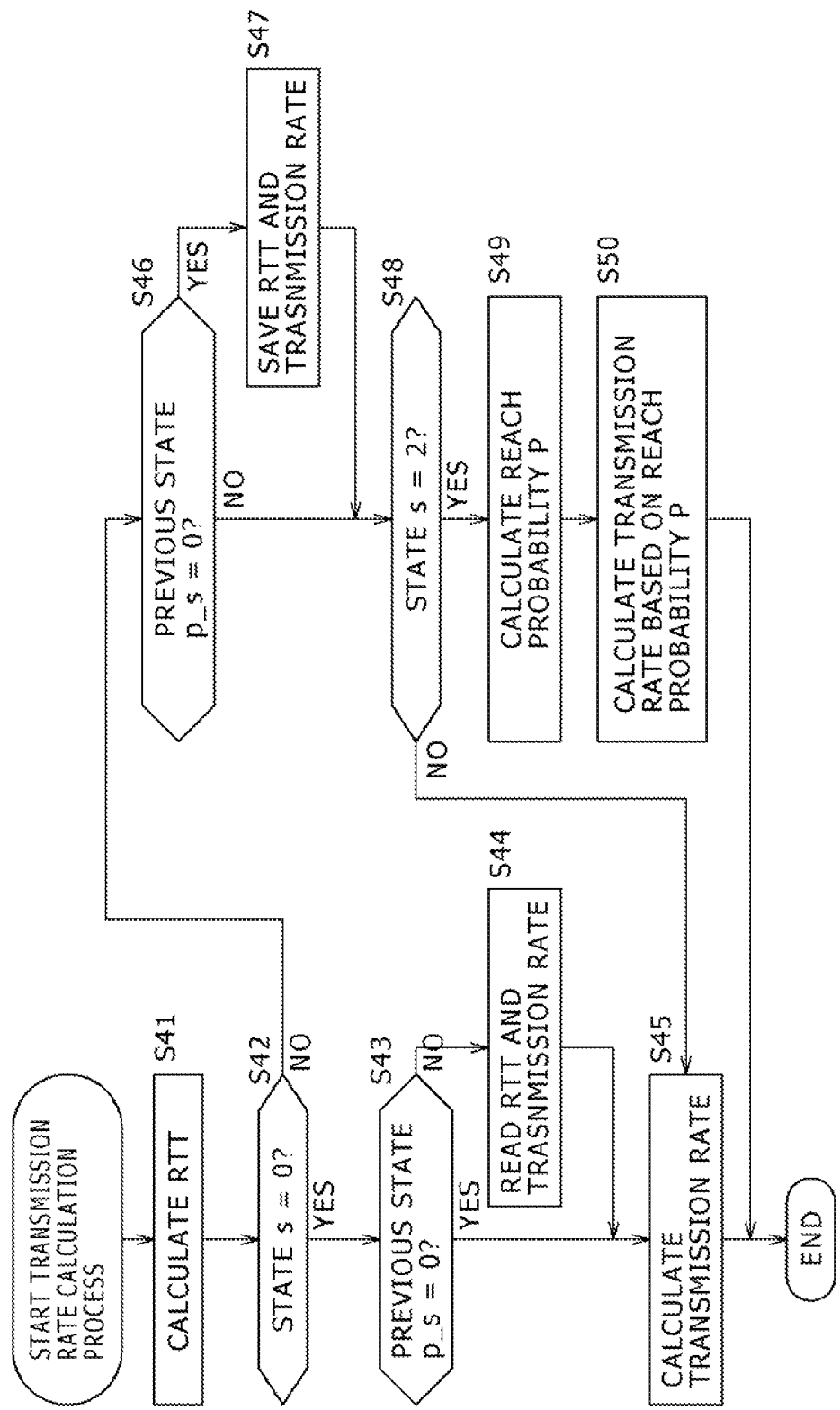

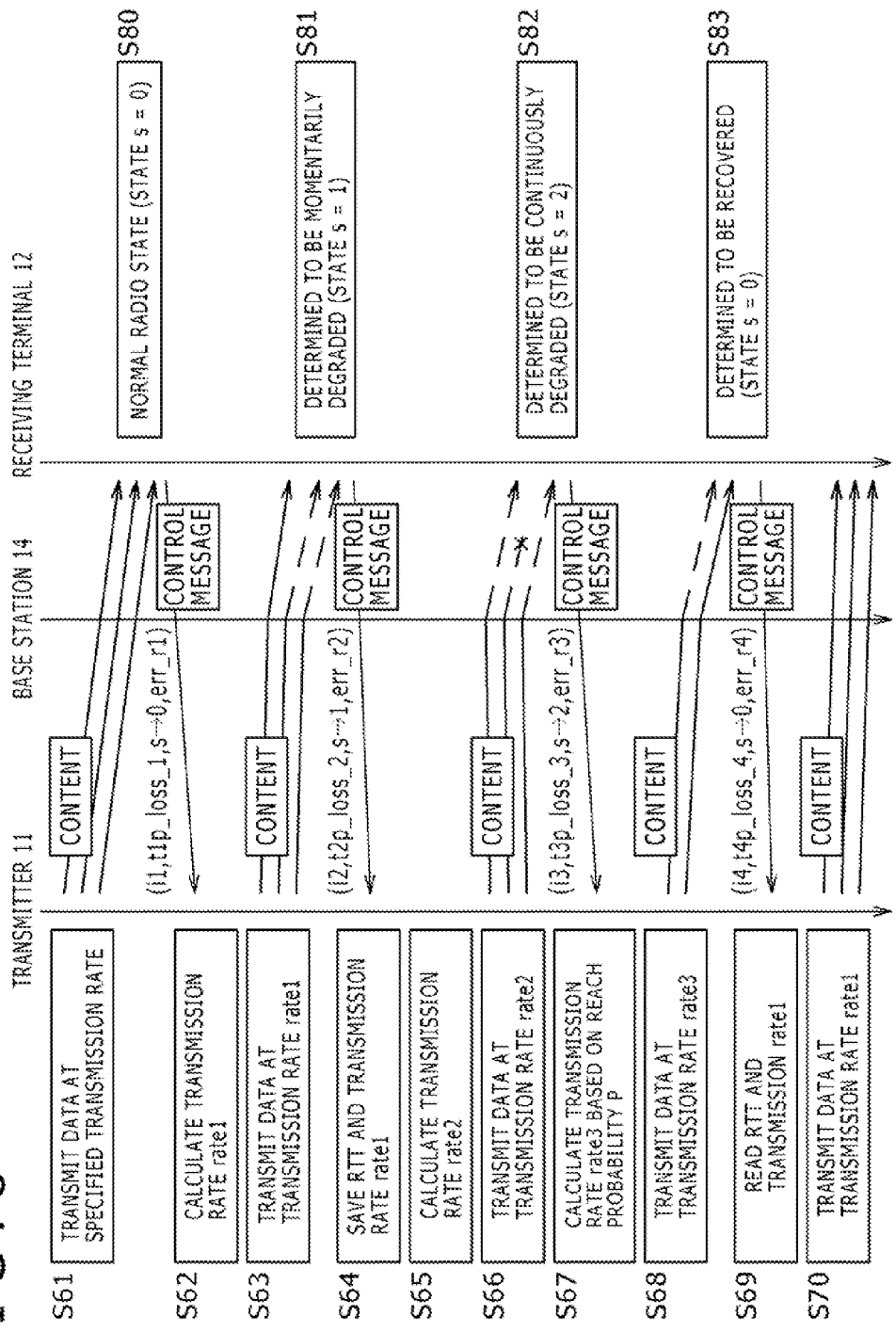

TRANSMITTING AND RECEIVING SYSTEM, TRANSMITTING APPARATUS, TRANSMITTING METHOD, RECEIVING APPARATUS, RECEIVING METHOD, AND PROGRAM

CROSS-REFERENCE TO RELATED APPLICATIONS

The present application is a divisional of U.S. patent application Ser. No. 11/278,073, filed on Mar. 30, 2006 which claims priority to Japanese Patent Document No. P2005-122971 filed on Apr. 20, 2005, the disclosure of which is herein incorporated by reference.

BACKGROUND

The present application relates to a transmitting and receiving system, a transmitting apparatus, a transmitting method, a receiving apparatus, a receiving method, and a program. More specifically, the application relates to a transmitting and receiving system, a transmitting apparatus, a transmitting method, a receiving apparatus, a receiving method, and a program capable of fast resuming data transmission quality during recovery from a degraded state to a normal state based on a transmission control state before the degradation in consideration for radio variations and radio link control.

In due course of progress in the recent home networking and increasing need for radio communications (e.g., cellular network, radio LAN (Local Area Network), and UWB (Ultra Wide Band)), there is expected an increasing demand for streaming reproduction of high-quality audiovisual data via radio networks in the future.

In an expected situation, for example, a user may want to use bidirectional communication services such as video on-demand services and video chatting supplied by a content provider. The user may want to streamingly reproduce data transmitted from the content provider on a personal computer (PC) or a display unit wirelessly connected to the content provider at home.

Transmission of data on IP (Internet Protocol) networks requires control over transmission rates in accordance with states of data reproduction encoding rates, available bands on the IP network, and IP network congestion. General techniques for controlling transmission rates include not only the technique using TCP (Transmission Control Protocol) having data arrival reliability, but also the technique using RTP (Real-time Transport Protocol) defined in highly realtime RFC (Request For Comment) 1889 (e.g., TFRC (TCP-Friendly Rate Control) defined in RFC3448). These techniques are constructed to aim at wired networks with small communication errors.

Generally, a radio network may experience multi-path propagation due to reflected waves from various obstacles. According to the transmission channel characteristic (communication channel characteristic), propagation delay differences cause frequency selective fading that distorts frequency characteristics within transmission bands to remarkably vary or degrade communication states (communication quality).

By contrast, a radio network area is formed between a sending party and a receiving party and is composed of a radio base station and a radio terminal. In order to improve remarkable variations or degradation of communication states, the radio network area is provided with techniques (radio link control) such as antenna diversity, error resistive bit coding, and error packet retransmission.

Even though these techniques are provided, radio communication states or ambient environment degrades communication states such as an increase in packet error rates (radio packet error rates) or Round Trip Time (RTT) during radio communication for a short or long period of time. Such degradation of the communication state is exceptional for the above-mentioned techniques of controlling wired network transmission rates. As a result, the degraded communication state causes congestion in the radio communication and degradation or instability of the data transmission quality (transmission rate (sending rate), transmission delay, etc.). After the radio communication state recovers, the transmission rate recovery delays. Accordingly, the above-mentioned techniques of controlling wired network transmission rates are improper for the streaming reproduction.

FIGS. 1A through 1C show examples of indoor experiment on a radio LAN. With reference to these diagrams, the following describes communication situations of controlling transmission rates according to the transmission rate control technique using the RTP operating on the UDP (User Datagram Protocol) under fading environment.

FIG. 1A shows temporal changes of radio packet error rates (%). FIG. 1B shows temporal changes of transmission rates (Mbps). An upper part of FIG. 1C shows temporal changes of RTT (ms). A lower part of FIG. 1C shows temporal changes of loss rates of packets (packet loss rates) (%). In FIGS. 1A through 1C, the abscissa represents time (s).

As shown in FIG. 1A, several states correspond to the radio packet error rates at the boundary of approximately 20%: a degraded state having large values for a short period, less than several hundreds of milliseconds; a degraded state having large values for a long period, ranging from several hundreds of milliseconds to several seconds; and a normal state having small values. The boundary and values indicate specific tendencies depending on fading situations and radio chip algorithms.

In FIG. 1A, a high radio packet error rate for one second or longer occurs approximately at the time point of 42 seconds (circle A1 in FIG. 1A) to decrease the corresponding throughput (transmissible effective rate) for improving the radio network. As shown in FIG. 1C, the RTT and the packet loss rate increase accordingly (circles C1 and D1 in FIG. 1C). As a result, the transmission rate control technique using RTP decreases the transmission rate as the RTT and the packet loss rate increase.

Afterwards, as shown in FIG. 1A, approximately at the time point of 44 or 45 seconds, the long degrading radio state is restored to the normal state with a low error rate (point A2 in FIG. 1A). Also in this case, it takes approximately three or four seconds b1 for the transmission rate to resume a state (point B2 in FIG. 1B) equivalent to the state before the degraded radio state. This is because the AIMD (Additive Increase, Multiplicative Decrease) algorithm is used to gradually increase the transmission rate for recovery.

Similarly, in FIG. 1A, a high radio packet error rate for one second or longer occurs approximately at the time point of 55 seconds (circle A3 in FIG. 1A). As a result, the throughput for the radio area decreases. As shown in FIG. 1C, the RTT and the packet loss rate increase accordingly (circles C2 and D2 in FIG. 1C). Also in this case, the transmission rate decreases as the RTT and the packet loss rate increase (circle B3 in FIG. 1B). The transmission rate remains low approximately at the time point of 57 seconds (point A4 in FIG. 1A) where the radio packet error rate is restored to the normal state. It takes approximately 10 seconds b2 for the transmission rate to be restored (point B4 in FIG. 1B).

As a result, the transmission rate is controlled based on the transmission rate control technique using the RTP in FIGS. 1A through 1C. Increasing the RTT (points C1 and C2 in FIG. 1C) causes irregular framing in a streamed image. Afterwards, remarkable degradation occurs when the transmission rate decreases (between points B1 and B2 and between points B3 and B4 in FIG. 1B).

As mentioned above, the transmission rate control technique using the RTP causes discrepancy between the transmission rate and the throughput for the radio area during a long degraded radio state. The RTT and the packet loss rate increase to remarkably decrease the transmission rate. In addition, the transmission rate slowly recovers after the radio state recovers. Because of these two factors, that control technique is inappropriate for streaming reproduction.

To solve this problem, there is a demand for a transmission rate control technique that has a congestion control function requested for wired networks, complies with the above-mentioned transmission channel characteristics specific to radio networks and effects of the control provided for radio networks, and provides high-performance and stable data transmission quality.

It is desirable to possibly avoid changes in the existing system construction such as introducing a new apparatus.

For example, a possible transmission rate control technique compliant with radio networks determines a congestion state and a degraded radio state based on the RTT, the packet loss rate, and the radio packet error rate. To correct degraded radio states, there is the technique that maintains and stabilizes the transmission rate (e.g., see JP 2001/160824).

However, the technique disclosed in JP 2001/160824 gives no consideration to the radio link control such as the above-mentioned packet retransmission performed on radio networks, thus causing congestion during radio communication.

According to the other techniques (e.g., see JP 2004/153616 and JP 2004/153619), a radio communication terminal determines the radio communication transmission rate using control information such as DRC (Data Rate Control) in the 1xEV-DO cellular packet network system and transmits the transmission rate to a data delivery apparatus. The techniques disclosed in JP 2004/153616 and JP 2004/153619 cannot be applied to radio LANs that are provided with no protocol for transmitting control information such as DRC. Further, the techniques disclosed in JP 2004/153616 and JP 2004/153619 give no consideration to the congestion control for wired and radio communications.

According to yet another technique, a relay node on the wired network converts data encoding rates depending on degradation of radio communication states detected by using the packet loss rate to adjust rates of transmission to the radio base station. In this manner, the relay node prevents a delay in data arrival from increasing. That is, the technique separates the radio communication from the wired communication for control (e.g., see JP 2004/15761).

However, the technique disclosed in JP 2004/15761 uses the packet loss rate to detect degradation of communication states, thus slowing down the response time of the transmission rate control. The system using this technique requires a relay node.

Moreover, JP 2001/160824, JP 2004/153616, JP 2004/153619 and JP 2004/15761 provide no control over radio communication states in consideration for the long-term and short-term states discussed with reference to FIGS. 1A to 1C.

SUMMARY

As disclosed in the above-mentioned related art, there are proposed several transmission rate control techniques compliant with radio networks. However, no techniques provide fast restoration of the data transmission quality after restoration of the radio state and are suited for streaming reproduction.

Embodiments of the present application are able to give consideration to radio state variations and radio link control, decrease degradation of data transmission quality when the radio communication is degraded, and fast recover the data transmission quality based on a transmission control state before degradation when the radio communication recovers from a degraded state to a normal state.

In a first transmitting and receiving system according to an embodiment, a transmitting apparatus includes data transmission means for transmitting data, state information reception means for receiving state information indicative of a radio communication state from a receiving apparatus, and control means for controlling transmission performed by the data transmission means. When the state information reception means receives state information indicating a degraded state of the radio communication, the control means stores control information for the data transmission means to control transmission immediately before the state information is received. When the state information reception means thereafter receives state information indicating a normal state of the radio communication, the control means uses the most recently stored control information to control transmission by means of the data transmission means. The receiving apparatus includes: data reception means for receiving data transmitted from the data transmission means by means of the radio communication; determination means for determining the radio communication state based on data received by the data reception means; and state information transmission means for transmitting state information indicating the radio communication state determined by the determination means to the transmitting apparatus.

A first transmitting apparatus according to an embodiment includes: data transmission means for transmitting the data; state information reception means for receiving state information indicative of states of the radio communication from the receiving apparatus; and control means for controlling transmission using the data transmission means. When the state information reception means receives state information indicating a degraded state of the radio communication, the control means stores control information for the data transmission means to control transmission immediately before the state information is received. When the state information reception means thereafter receives state information indicating a normal state of the radio communication, the control means uses the most recently stored control information to control transmission by means of the data transmission means.

The state information reception means receives state information representing any one of a long degraded state, a short degraded state, and the normal state of the radio communication. When the state information reception means receives state information indicating a long degraded state of the radio communication, the control means controls transmission corresponding to a degraded state of the radio communication.

The control information includes information about a transmission rate or RTT. When the state information reception means receives state information indicating the degraded state and then state information indicating the normal state, the control means can control transmission of the data transmission means so that the data is transmitted at the most recently stored transmission rate or at a transmission rate calculated using control information including the RTT.

The control information further contains information of Round Trip Time (RTT). When the state information reception means receives state information indicating the degraded state and then state information indicating the normal state, the control means can control transmission of the data transmission means so that the data is transmitted at a transmission rate calculated based on the most recently stored transmission rate and RTT.

A first transmitting method according to an embodiment includes: transmitting the data; receiving state information indicating the radio communication state from the receiving apparatus; and controlling transmission according to a process of the data transmission step. When a process at the state information reception step receives state information indicating a degraded state of the radio communication, a process at the control step stores control information for controlling transmission according to a process at the data transmission step immediately before reception of the state information. When the state information reception step thereafter receives state information indicating a normal state of the radio communication, the process at the control step uses the most recently stored control information to control transmission according to the process at the data transmission step.

A first transmitting program according to an embodiment includes: transmitting the data; receiving state information indicating the radio communication state from the receiving apparatus; and controlling transmission according to a process of the data transmission step. When a process at the state information reception step receives state information indicating a degraded state of the radio communication, a process at the control step stores control information for controlling transmission according to a process at the data transmission step immediately before reception of the state information. When the state information reception step thereafter receives state information indicating a normal state of the radio communication, the process at the control step uses the most recently stored control information to control transmission according to the process at the data transmission step.

A first receiving apparatus according to an embodiment includes: data reception means for receiving data transmitted from the transmitting apparatus by means of the radio communication; determination means for determining the radio communication state based on data received by the data reception means; and state information transmission means for transmitting state information indicating the radio communication state determined by the determination means to the transmitting apparatus.

The determination means can determine based on the received data that the radio communication state corresponds to which of a long degraded state, a short degraded state, and a normal state.

The first receiving apparatus further includes detection means for detecting radio communication information about the radio communication state based on the data. The determination means can determine the radio communication state based on a value for the radio communication state detected by the detection means at a specified time and an average of values for the radio communication information detected within a specified time period including that time.

A first receiving method according to an embodiment includes the steps of: receiving data transmitted from the transmitting apparatus by means of the radio communication; determining the radio communication state based on data received by a process at the data reception means; and transmitting state information indicating the radio communication state determined by a process at the determination step to the transmitting apparatus.

A second program according to an embodiment includes the steps of: receiving data transmitted from the transmitting apparatus by means of the radio communication; determining the radio communication state based on data received by a process at the data reception means; and transmitting state information indicating the radio communication state determined by a process at the determination step to the transmitting apparatus.

In a second transmitting and receiving system according to an embodiment, a transmitting apparatus includes: data transmission means for transmitting the data; control information reception means for receiving control information to control transmission performed by the data transmission means; and control means for controlling transmission performed by the data transmission means based on control information received by the control information reception means. A receiving apparatus includes: data reception means for receiving data transmitted from the data transmission means by means of the radio communication; determination means for determining the radio communication state based on data received by the data reception means; generation means for generating the control information based on the radio communication state determined by the determination means; and control information transmission means for transmitting control information generated by the generation means to the transmitting apparatus. When the determination means determines the radio communication state to be degraded, the generation means stores the most recently generated control information. When the determination means thereafter determines the radio communication state to be normal, the generation means uses the most recently generated control information to generate the control information.

A second transmitting apparatus according to an embodiment includes: data transmission means for transmitting the data; control information reception means for receiving control information which is transmitted from the receiving apparatus based on the radio communication state and is used to control transmission performed by the data transmission means; and control means for controlling transmission performed by the data transmission means based on control information received by the control information reception means.

A second transmitting method according to an embodiment includes the steps of: transmitting the data; receiving control information which is transmitted from the receiving apparatus based on the radio communication state and is used to control transmission according to a process at the data transmission step; and controlling transmission according to a process of the data transmission step based on control information received by a process at the control information reception step.

A third program according to an embodiment includes: transmitting the data; receiving control information which is transmitted from the receiving apparatus based on the radio communication state and is used to control transmission according to a process at the data transmission step; and controlling transmission according to a process of the data transmission step based on control information received by a process at the control information reception step.

A second receiving apparatus according to an embodiment includes: data reception means for receiving data transmitted from the transmitting apparatus by means of the radio communication; determination means for determining the radio communication state based on data received by the data reception means; and generation means for generating control information to control transmission performed by the transmitting apparatus based on the radio communication state determined by the determination means; and control information transmission means for transmitting control information generated by the generation means to the transmitting apparatus. When the determination means determines the radio communication state to be degraded, the generation means stores the most recently generated control information. When the determination means thereafter determines the radio communication state to be normal, uses the most recently generated control information to generate the control information.

The determination means determines based on the received data that the radio communication state corresponds to which of a long degraded state, a short degraded state, and the normal state.

When the determination means determines the radio communication state to be long degraded, the generation means generates the control information corresponding to the radio communication state's degraded state.

The second receiving apparatus further includes detection means for detecting radio communication information about the radio communication based on the data. The determination means determines the radio communication state based on a value for the radio communication state detected by the detection means at a specified time and an average of values for the radio communication information detected within a specified time period including that time.

The control information includes information about transmission rates or information of Round Trip Time (RTT). When the determination means determines the radio communication state to be degraded and then to be normal, the generation means generates control information based on the most recently stored control information including transmission rate and RTT.

A second receiving method according to an embodiment includes the steps of: receiving data transmitted from the transmitting apparatus by means of the radio communication; determining the radio communication state based on data received by a process at the data reception means; generating control information to control transmission performed by the transmitting apparatus based on the radio communication state determined by a process at the determination step; and transmitting control information generated by a process at the generation step to the transmitting apparatus. When a process at the determination step determines the radio communication state to be degraded, a process at the generation step stores the most recently generated control information. When a process at the determination step thereafter determines the radio communication state to be normal, a process at the generation step uses the most recently generated control information to generate the control information.

A fourth program according to an embodiment includes the steps of: receiving data transmitted from the transmitting apparatus by means of the radio communication: determining the radio communication state based on data received by a process at the data reception means; generating control information to control transmission performed by the transmitting apparatus based on the radio communication state determined by a process at the determination step; and transmitting control information generated by a process at the generation step to the transmitting apparatus. When a process at the determination step determines the radio communication state to be degraded, a process at the generation step stores the most recently generated control information. When a process at the determination step thereafter determines the radio communication state to be normal, a process at the generation step uses the most recently generated control information to generate the control information.

When the transmitting apparatus receives state information from the receiving apparatus, the state information may indicate a degraded state of the radio communication. In this case, the first transmitting and receiving system according to an embodiment stores the control information for controlling data transmission immediately before the state information is received. When the transmitting apparatus thereafter receives state information indicating a normal state of the radio communication, the first transmitting and receiving system uses the most recently stored control information to control the data transmission. The receiving apparatus uses the radio communication to receive data from the transmitting apparatus. Based on the data, the receiving apparatus determines the radio communication state and transmits the state information indicating the radio communication state to the transmitting apparatus.

When the transmitting apparatus receives state information from the receiving apparatus, the state information may indicate a degraded state of the radio communication. In this case, the first transmitting apparatus, the first transmitting method, and the first program according to an embodiment store the control information for controlling data transmission immediately before the state information is received. When the transmitting apparatus thereafter receives state information indicating a normal state of the radio communication, the transmitting and receiving system the first transmitting apparatus, the first transmitting method, and the first program use the most recently stored control information to control the data transmission.

The first receiving apparatus, the first receiving method, and the second program according to an embodiment receive data transmitted from the transmitting apparatus by means of radio communication. Based on the data, the first receiving apparatus, the first receiving method, and the second program determine a radio communication state and transmit state information indicating the radio communication state to the transmitting apparatus.

In the second transmitting and receiving system according to an embodiment, the transmitting apparatus receives control information for controlling transmission and controls data transmission based on the control information. The receiving apparatus receives data transmitted from the transmitting apparatus by means of radio communication and determines a radio communication state based on that data. When the radio communication state is determined to be degraded, the receiving apparatus stores the most recently generated control information. When the radio communication state is thereafter determined to be normal, the receiving apparatus uses the most recently stored control information to generate control information and transmits the control information to the transmitting apparatus.

The second transmitting apparatus, the second transmitting method, and the third program according to an embodiment receive control information that is transmitted from the receiving apparatus based on the radio communication state and is used to control data transmission. Based on the control information, the second transmitting apparatus, the second transmitting method, and the third program control the data transmission.

The second receiving apparatus, the second receiving method, and the fourth program according to an embodiment receives data transmitted from the transmitting apparatus by means of radio communication and determines a radio communication state based on that data. When the radio communication state is determined to be degraded, the second receiving apparatus, the second receiving method, and the fourth program store the most recently generated control information. When the radio communication state is thereafter determined to be normal, the second receiving apparatus, the second receiving method, and the fourth program use the most recently stored control information to generate control information and transmit the control information to the transmitting apparatus.

According to the above described embodiments, it is possible to decrease degradation of data transmission quality when the radio communication is degraded, and quickly recover the data transmission quality based on a transmission control state before degradation when the radio communication recovers from the degraded state to a normal state.

Additional features and advantages are described herein, and will be apparent from, the following Detailed Description and the figures.

BRIEF DESCRIPTION OF THE FIGURES

Embodiments of the present invention will be described in detail based on the following figures, wherein:

FIG. 2 shows a functional construction example of a transmission system according to an embodiment of the invention;

FIG. 4 describes state s determined by an analysis unit in FIG. 2;

FIG. 7 is a flowchart showing a transmission rate calculation process performed by a rate calculation unit in FIG. 2;

FIG. 8 shows a data transmission process in which the transmitter in FIG. 2 transmits data to the receiving terminal;

DETAILED DESCRIPTION

Figure 1A:
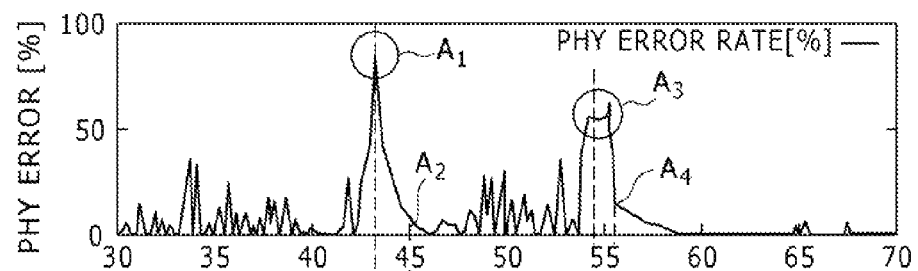
FIGS. 1A to 1C exemplify transmission rates when a well-known transmission rate control technique is used to control transmission rates.

Embodiments of the present invention will be described in further detail below with reference to the accompanying drawings.

FIG. 2 shows a functional construction example of a transmission system 1 according to an embodiment.

The transmission system 1 in FIG. 2 is composed of a transmitter 11, a receiving terminal 12, a wired IP network 13, and a radio base station 14. The transmitter 11 sends (transmits) data to the receiving terminal 12 via the IP network 13 and the radio base station 14. The receiving terminal 12 receives the data by means of radio communication. In the appended claims, data transmission means can be embodied by a transmission unit 24A in FIG. 2, for example; state information reception means can be embodied by a reception means 24B in FIG. 2, for example; control means can be embodied by a rate calculation unit 25 in FIG. 2, for example; data reception means can be embodied by a reception means 42B in FIG. 2, for example; determination means can be embodied by an analysis unit 47 in FIG. 2, for example; and state information transmission means can be embodied by a transmission unit 42A in FIG. 2, for example.

The transmitter 11 is composed of a content storage unit 21, a coding unit 22, a transmission control unit 23, a communication unit 24, a rate calculation unit 25, a storage unit 26, and a timer unit 27.

The content storage unit 21 of the transmitter 11 stores data previously transmitted from an external personal computer (not shown) via the IP network 13. Further, the content storage unit 21 stores data captured by a digital still camera (not shown) provided for the transmitter 11. The content storage unit 21 also reads data stored in the content storage unit 21 and supplies the read data to the coding unit 22.

The coding unit 22 determines a coding rate based on a transmission rate from the rate calculation unit 25. Using the coding rate, the coding unit 22 encodes data supplied from the content storage unit 21, packetizes the data, and supplies it to the transmission control unit 23. As a result, the data is transmitted at the transmission rate from the rate calculation unit 25.

The transmission control unit 23 supplies the communication unit 24 with the packetized data from the coding unit 22. Each packet is provided with a sequential number (hereafter referred to as a sequence number) and has header information including the sequence number and the like.

The communication unit 24 is composed of the transmission unit 24A and the reception means 24B. The transmission unit 24A transmits packetized data from the transmission control unit 23 via the IP network 13 and the base station 14. The reception means 24B receives a control message. The control message is information representing: radio communication state s transmitted from an antenna 41 via the IP network 13 and the base station 14; a radio packet error rate; a packet loss rate; a sequence number; and time t between the time to receive data (hereafter referred to as a data reception time) on the receiving terminal 12 corresponding to the reception means 24B itself and the time to transmit the control message (hereafter referred to as a control message transmission time) from itself. The reception means 24B supplies the control message to the rate calculation unit 25.

The rate calculation unit 25 calculates the transmission rate and the RTT based on the control message from the reception means 24B and information indicative of the current time supplied from the timer unit 27. Depending on needs, the rate calculation unit 25 supplies the transmission rate and the RTT to the content storage unit 26 for storage and reads the transmission rate and the RTT already stored in the storage unit 26. The rate calculation unit 25 supplies the transmission rate to the coding unit 22.

The coding unit 22 may provide hierarchical coding compliant with JPEG (Joint Photographic Experts Group) 2000. In such case, the rate calculation unit 25 supplies the transmission control unit 23 with the transmission rate. The transmission control unit 23 adjusts the amount of data to be transmitted based on the transmission rate to change the transmission rate.

The storage unit 26 stores the transmission rate and the RTT from the rate calculation unit 25. The timer unit 27 keeps track of the current time and supplies the information indicative of the current time to the rate calculation unit 25.

The IP network 13 is provided for a provider or the inside of a home, for example, and is connected to the base station 14. Data is transmitted from the transmission unit 24A of the communication unit 24 and is supplied to the base station 14 via the wired IP network 13. The base station 14 receives the control message corresponding to the radio wave. That control message is supplied to the reception means 24B of the transmitter 11 via the wired IP network 13.

The base station 14 outputs radio waves corresponding to the data supplied via the IP network 13 and receives output radio waves via the antenna 41 to perform radio communication.

The receiving terminal 12 is composed of the antenna 41, the radio communication unit 42, a reception detection unit 43, a decoding unit 44, an output unit 45, a radio monitoring unit 46, the analysis unit 47, a storage unit 48, and a timer unit 49.

The base station 14 outputs a radio wave that is received at the antenna 41 and is then supplied to the radio communication unit 42. The radio communication unit 42 is composed of the transmission unit 42A and the reception means 42B. The analysis unit 47 supplies the transmission unit 42A with the control message, i.e., the information indicative of radio communication state s, the radio packet error rate, the packet loss rate, the sequence number, and time t. The transmission unit 42A packetizes the control message and outputs a radio wave corresponding to the packetized control message via the antenna 41.

The reception means 42B receives the radio wave via the antenna 41 and converts it into data corresponding to the radio wave. The reception means 42B supplies the data to the reception detection unit 43 and the radio monitoring unit 46. That is, the reception means 42B uses radio communication to receive data from the base station 14 via the antenna 41 and supplies the received data to the reception detection unit 43 and the radio monitoring unit 46.

The reception detection unit 43 detects a packet loss rate in the entire communication channel (the IP network 13 and the radio area between the base station 14 and the antenna 41) based on the packetized data from the reception means 42B and supplies the packetized data to the analysis unit 47. The reception detection unit 43 acquires a sequence number in the header information attached to the packet. The reception detection unit 43 is supplied with the time information indicative of the current time from the timer unit 49. Based on the time information, the reception detection unit 43 acquires the current time as data reception time. The reception detection unit 43 supplies the sequence number and the data reception time to the analysis unit 47. Further, the reception detection unit 43 supplies the decoding unit 44 with data from the reception means 42B.

The reception detection unit 43 may detect not only the packet loss rate, but also the number of received packets and the RTT.

The decoding unit 44 decodes data from the reception detection unit 43 and supplies the data to the output unit 45. The output unit 45 outputs images and sounds corresponding to the data from the decoding unit 44.

The radio monitoring unit 46 monitors information about radio-specific communication states resulting from fading and the like based on the packetized data from the reception means 42B. For example, the radio monitoring unit 46 monitors physical errors such as verification errors and CRC (Cyclic Redundancy Check) errors as the information about radio-specific communication states to calculate the radio packet error rate. The radio monitoring unit 46 supplies the radio packet error rate to the analysis unit 47.

The radio monitoring unit 46 may monitor the information about radio-specific communication states including not only the radio packet error rate, but also received wave intensity, signal-to-noise ratio, communication speed mode, radio bit error rate, and the number of retransmissions. According to the embodiment, however, the information represents influences (RTT, throughput, etc.) on the communication channel due to fading in consideration for experimental measurements using a radio LAN. In addition, the embodiment exemplifies a radio packet error rate the receiving terminal 12 can acquire.

The analysis unit 47 supplies the radio packet error rate from the radio monitoring unit 46 to the storage unit 48 for storage. The analysis unit 47 reads the radio packet error rate already stored in the storage unit 48 and determines radio communication state s based on the radio packet error rate. The analysis unit 47 works based on the time information from the timer unit 49 to identify the time to transmit a control message as the control message transmission time. The analysis unit 47 calculates time t between the control message transmission time and the data reception time from the reception detection unit 43. The analysis unit 47 supplies the control message to the transmission unit 42A of the radio communication unit 42. In this case, the control message contains information indicative of state s, the radio packet error rate from the radio monitoring unit 46, the packet loss rate and the sequence number from the reception detection unit 43, and time t.

The storage unit 48 stores the radio packet error rate from the analysis unit 47. The timer unit 49 keeps track of the current time and supplies the information indicative of the time to the reception detection unit 43 and the analysis unit 47.

Figure 3:
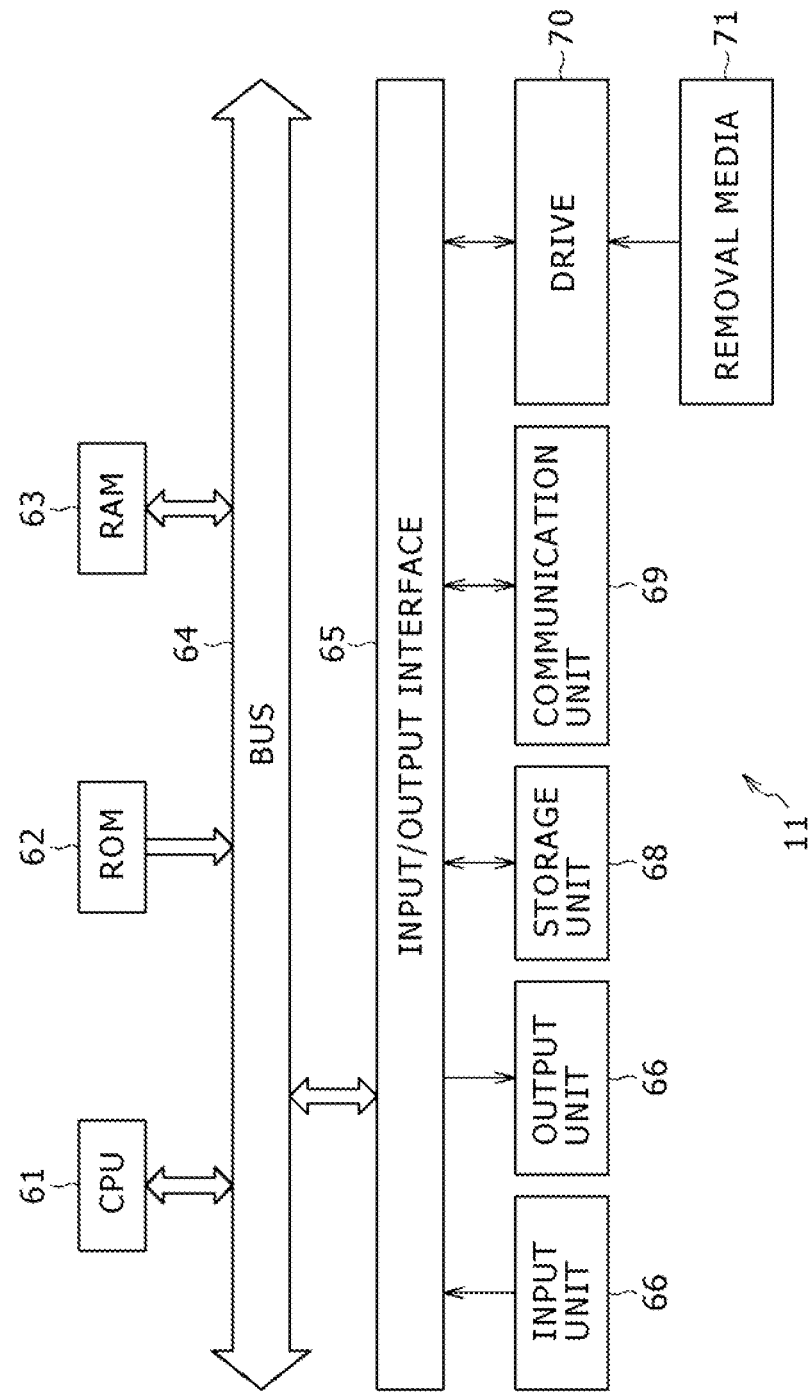
FIG. 3 is a block diagram exemplifying the hardware construction of a transmitter in FIG. 2.

FIG. 3 is a block diagram exemplifying the hardware construction of the transmitter 11 in FIG. 2.

As shown in FIG. 3, a CPU (Central Processing Unit) 61 is connected to ROM (Read Only Memory) 62 and RAM (Random Access Memory) 63 via a bus 64. The CPU 61 performs various processes in accordance with a program stored in the ROM 62 or a program recorded in a recording unit 68. The RAM 63 stores programs and data used for the CPU 61 as needed.

Further, the CPU 61 connects with an input/output interface 65 via the bus 64. The input/output interface 65 connects with an input unit 66 composed of a keyboard, a mouse, and the like, and an output unit 67 composed of an LCD (Liquid Crystal Display), a CRT (Cathode Ray Tube), and the like. The CPU 61 performs various processes corresponding to commands supplied from the input unit 66. The CPU 61 outputs images and sounds resulting from the processes to the output unit 67.

The recording unit 68 connected to the input/output interface 65 is composed of a hard disk, for example, and records programs and various data used for the CPU 61. The communication unit 69 communicates with the receiving terminal 12 via the IP network 13 and the base station 14, for example.

Programs may be acquired via the communication unit 69 and may be recorded in the recording unit 68.

A drive 70 is connected to the input/output interface 65, drives a removable medium 71 such as a magnetic disk, an optical disk, a magnetic-optical disk, or semiconductor memory when mounted, and acquires programs or data recorded therein. The acquired program or data is transferred to the recording unit 68 for recording.

The receiving terminal 12 is constructed similarly to the transmitter 11 and the description is omitted. The communication unit 69 of the receiving terminal 12 is composed of the antenna 41 and the like to provide radio communication.

Referring now to FIG. 4, the following describes state s determined by the analysis unit 47 in FIG. 2.

As shown in FIG. 4, radio communication state s is represented as three levels 0 through 2. Specifically, the determination uses instantaneous value err and mobile average value err_ave. Instantaneous value err indicates a difference between radio packet error rates calculated (detected) by the radio monitoring unit 46 at specified times. Mobile average value err_ave indicates an average of differences between radio packet error rates detected within a specified time period including a given time. When both values err and err_ave are small, the analysis unit 47 assumes the radio communication state to be stable (normal state) and sets the radio communication state s to 1. In this case, the rate calculation unit 25 of the transmitter 11 provides transmission rate control (hereafter referred to as wired congestion control) in consideration for the wired communication congestion.

There may be a case where mobile average value err_ave is small and instantaneous value err is large. In this case, the analysis unit 47 assumes the radio communication state to be a short degraded state (error state) and sets radio communication state s to 1. The rate calculation unit 25 uses the storage unit 26 to store (save) the RTT and the transmission rate calculated when the most recent radio communication state s is 0 so as to provide the wired congestion control.

When radio communication state s changes from 1 to 0, the rate calculation unit 25 assumes the transmission rate stored in the storage unit 26 with state s set to 1 to be a new transmission rate.

When mobile average value err_ave is large, the analysis unit 47 assumes radio communication state s to be a long degraded state and sets radio communication state s to 2. In this case, the rate calculation unit 25 provides the transmission rate control appropriate to the radio communication state (situation).

When radio communication state s changes from 0 to 2, the rate calculation unit 25 also uses the storage medium 26 to store the RTT and the transmission rate calculated when the most recent radio communication state s is 0. When radio communication state s is restored to 0 from 2, the rate calculation unit 25 assumes that transmission rate to be a new transmission rate.

The following describes the reason to represent radio communication state s using three levels, i.e., normal state, short degraded state, and long degraded state. The applicants made experiments under several conditions using a radio LAN (e.g., a radio LAN compliant with IEEE (Institute of Electrical and Electronics Engineers) 802.11) and examined fading occurrence and its influence. As a result, the applicants found that the radio communication is subject to occurrence of both a short degraded state of radio communication and a slightly long degraded state of radio communication for several hundreds of milliseconds to several seconds.

As a result of further detailed examinations, the applicants found that a long degraded state of radio communication occurs when there are many reflective obstacles and ambient surroundings are greatly influenced by fading or when the base station 14 provides control to change a transmission mode or a coding rate.

In addition, the applicants examined an overall communication state between the transmitter 11 and the receiving terminal 12 to find that the short degraded state of radio communication usually does not immediately influence the overall communication state and that the long degraded state of radio communication greatly increases the RTT and decreases the throughput. This is possibly because, when the radio communication contains an extra band, the buffer control of the base station 14 may remove an influence of the momentary degraded state of the radio communication.

As mentioned above, the short degraded state of radio communication differs from the long degraded state of radio communication in influences on the overall communication state between the transmitter 11 and the receiving terminal 12. The transmission system 1 represents radio communication state s using three levels, i.e., the normal state, the short degraded state, and the long degraded state. The rate calculation unit 25 provides transmission rate control according to the levels.

State s, when set to 1, represents the short degraded state that does not immediately influence the overall communication state. When state s is set to 1, the rate calculation unit 25 provides the wired congestion control similarly to a case where state s is set to 0 to represent the normal state. On the other hand, state s, when set to 2, represents the radio communication's long degraded state that greatly increases the RTT and decreases the throughput. When state s is set to 2, the rate calculation unit 25 provides the transmission rate control appropriate for the radio communication state (situation).

Figure 5:
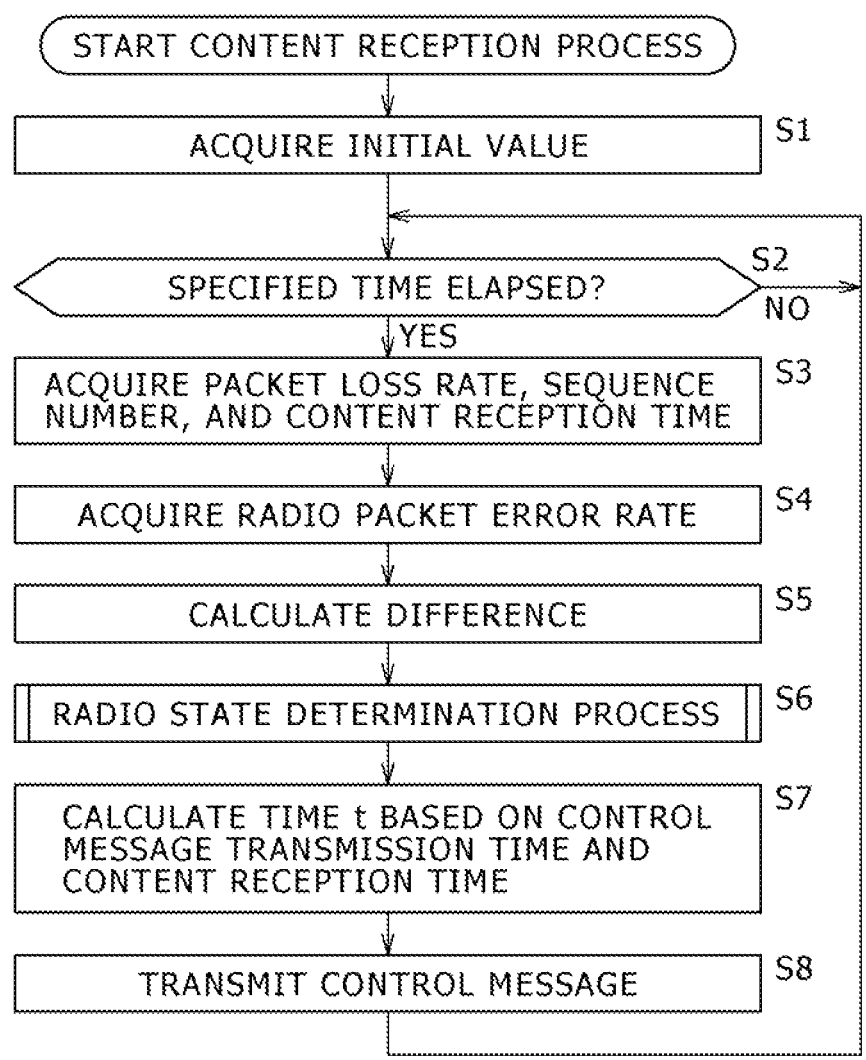
FIG. 5 is a flowchart showing a data reception process performed by a receiving terminal in FIG. 2.

Referring now to FIG. 5, the following describes a data (content) reception process performed by the receiving terminal in FIG. 2. For example, this data reception process starts when the reception means 42B receives a radio wave corresponding to data transmitted from the transmission unit 24A of the transmitter 11 via the IP network 13, the base station 14, and the antenna 41.

At Step S1, the radio monitoring unit 46 works based on packetized data supplied from the reception means 42B to calculate (acquire) the radio packet error rate as an initial value and supplies it to the analysis unit 47. The analysis unit 47 stores its instantaneous value err in the storage unit 48 and then proceeds to Step S2.

At Step S2, the analysis unit 47 determines whether or not a specified time (e.g., 20 through 50 ms) has elapsed. That is, the analysis unit 47 determines whether or not an interrupt is generated from a timer (not shown) that counts the time to acquire the radio packet error rate. When it is not determined that the specified time has elapsed, the analysis unit waits until the specified time elapses.

After Step S2, the process proceeds to Step S3. The reception detection unit 43 works based on the packetized data supplied from the reception means 42B and the time information from the timer unit 49 to acquire a packet loss rate, a sequence number, and a data reception time, and supplies them to the analysis unit 47.

More specifically, the reception detection unit 43 works based on the packetized data from the reception means 42B to detect (acquire) a packet loss rate for the overall communication channel and supplies it to the analysis unit 47. The reception detection unit 43 acquires the sequence number in the header information attached to the packet. Further, the reception detection unit 43 works based on the time information indicative of the current time supplied from the timer unit 49 to acquire the time as the data reception time and supplies the sequence number and the data reception time to the analysis unit 47.

After Step S3, the process proceeds to Step S4. The radio monitoring unit 46 works based on data supplied from the reception means 42B to acquire the radio packet error rate, supplies it to the analysis unit 47, and proceeds to Step S5.

At Step S5, the analysis unit 47 calculates a difference between two values as instantaneous value err. One is the initial value supplied at Step S1 or the radio packet error rate supplied at the previous Step S4. The other is the radio packet error rate supplied at the most recent Step S4. The process at Step S5 may be omitted to use the radio packet error rate from the radio monitoring unit 46 as instantaneous value err unchangedly.

After Step S5, the process proceeds to Step S6. The analysis unit 47 works based on instantaneous value err calculated at Step S5 to perform a radio state determination process that determines radio communication state s. The radio state determination process will be described in detail with reference to FIG. 6 later.

After Step S6, the process proceeds to Step S7. The analysis unit 47 assumes the time currently supplied from the patent document 49 to be the control message transmission time. Based on the control message transmission time and the data reception time supplied at Step S3, the analysis unit 47 calculates time t between the control message transmission time and the data reception time and the proceeds to Step S8.

At Step S8, the analysis unit 47 supplies a control message to the transmission unit 42A of the radio communication unit 42. The control message contains information indicative of state s determined at Step S6, the radio packet error rate supplied at Step S4, the packet loss rate and the sequence number supplied at Step S3, and time t calculated at Step S7. The transmission unit 42A packetizes the control message. The transmission unit 42A transmits radio wave corresponding to the packetized control message via the antenna 41 and then returns to Step S2 to repeat the above-mentioned process. That is, the packet loss rate, the sequence number, time t, and instantaneous value err are acquired and the control message is transmitted at every specified time.

Figure 6:
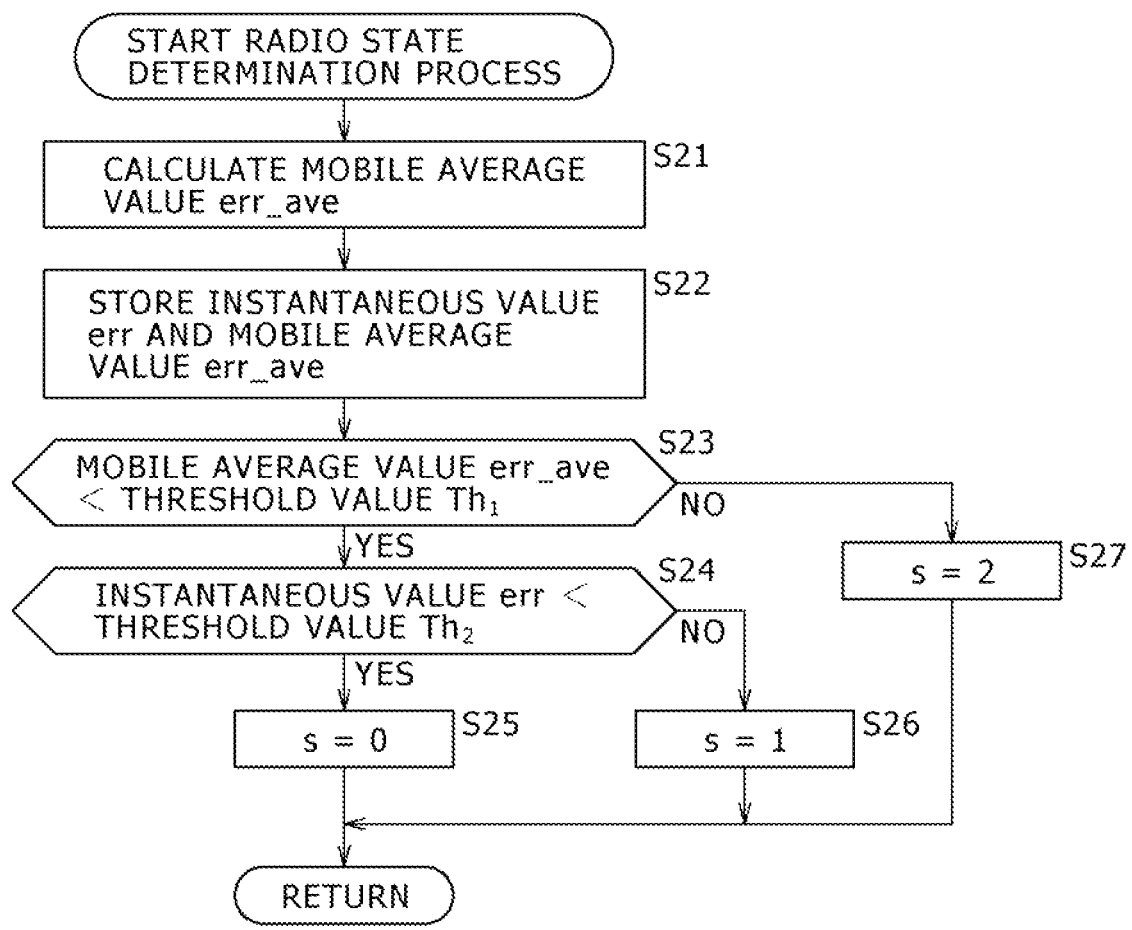
FIG. 6 is a flowchart showing a radio state determination process at Step S6 in FIG. 5.

Referring now to FIG. 6, the following describes the radio state determination process at Step S6 in FIG. 5.

At Step S21, the analysis unit 47 calculates mobile average value err_ave based on instantaneous value err calculated at the most recent Step S5 in FIG. 5 and instantaneous value err already stored in the storage unit 48. Specifically, the analysis unit 47 calculates previous average value err_ave', i.e., an average of instantaneous values err as many as the number of most recent values (e.g., 29) out of the instantaneous values err already stored in the storage unit 48. The analysis unit 47 works based on the previous average value err_ave' and instantaneous value err calculated at the most recent Step S5 to calculate mobile average value err_ave using equation (1) below.

$$\text{err\_ave} = \alpha \text{err\_ave}' + (1-\alpha)\text{err} \quad (1)$$

where $\alpha$ is the predetermined constant (e.g., 0.9) smaller than 1.

After Step S21, the process proceeds to Step S22. The analysis unit 47 uses the storage unit 48 to store instantaneous value err and mobile average value err_ave calculated at Step S5 in FIG. 5. When the storage unit 48 has no free area, the analysis unit 47 deletes the earliest instantaneous value err and mobile average value err_ave.

After Step S22, the process proceeds to Step S23. The analysis unit 47 determines whether or not mobile average value err_ave stored at Step S22 is smaller than predetermined threshold value Th1. When mobile average value err_ave is determined to be smaller than predetermined threshold value Th1, the process proceeds to Step S24.

At Step S24, the analysis unit 47 determines whether or not instantaneous value err is smaller than predetermined threshold value Th2. When instantaneous value err is determined to be smaller than predetermined threshold value Th2, the process proceeds to Step S25.

At Step S25, the analysis unit 47 sets radio communication state s to 0, returns Step S6 in FIG. 5, and then proceeds to Step S7.

When it is determined at Step S23 that mobile average value err_ave is not smaller than (is greater than or equal to) predetermined threshold value Th1, the process proceeds to Step S27. The analysis unit 47 sets state s to 2, returns to Step S6 in FIG. 5, and then proceeds to Step S7.

When it is determined at Step S24 that instantaneous value err is greater than or equal to specified threshold value Th2, the process proceeds to Step S26. The analysis unit 47 sets state s to 1, returns to Step S6 in FIG. 5, and proceeds to Step S7.

Referring now to FIG. 7, the following describes a transmission rate calculation process performed by the rate calculation unit 25 in FIG. 2. For example, the transmission rate calculation process starts when the reception means 24B receives a control message transmitted from the receiving terminal 12 at Step S8 in FIG. 5 via the base station 14 and the IP network 13.

At Step S41, the rate calculation unit 25 calculates the RTT based on the sequence number and time t in the control message supplied from the reception means 24B. Specifically, data transmission time T indicates the time for the transmission unit 24A to transmit data. The rate calculation unit 25 stores data transmission time T associated with a sequence number attached to that data in the storage unit 26. The rate calculation unit 25 works based on the sequence number from the reception means 24B to read data transmission time T1 corresponding to that sequence number from the storage unit 26. The rate calculation unit 25 uses data transmission time T1, time T2 supplied from the timer unit 27, and time t to calculate the RTT using equation (2) below.

$$\text{RTT} = T2 - T1 - t \quad (2)$$

After Step S41, the process proceeds to Step S42. The rate calculation unit 24 stores state s of the control message from the reception means 24B in the storage unit 26 and determines whether or not state s is set to 0.

When it is determined at Step S42 that state s is set to 0, the process proceeds to Step S43. The rate calculation unit 24 determines whether or not previous state p_s, i.e., state s stored in the storage unit 26 at the previous Step S42, is set to 0. When it is determined that previous state p_s is not 0, the process proceeds to Step S44.

At Step S44, the rate calculation unit 24 reads the RTT and the transmission rate saved (stored) at Step S47 (to be described) from the storage unit 26 and proceeds to S45.

At Step S45, the rate calculation unit 24 calculates a transmission rate using not only the read transmission rate or RTT, but also a TCP friendly transmission rate calculation equation for wired congestion control (e.g., TFRC specified in RFC3448).

Specifically, the rate calculation unit 24 assumes the read transmission rate to be a new transmission rate as is. In this case, the rate calculation unit 24 restores the short or long degraded state of the radio communication state s to the normal state to fast recover the transmission rate.

The rate calculation unit 24 can calculate a transmission rate using the RTT calculated at Step S41 or the RTT read at Step S44 and the packet loss rate in the control message just supplied from the reception means 24B. The transmission rate 24 can compare the calculated transmission rate with the read transmission rate to assume a smaller transmission rate to be the new transmission rate. In this case, the wired communication congestion is taken into consideration. Due to the remaining influence of the radio communication's degraded state, however, the transmission rate may become small.

The rate calculation unit 24 supplies the transmission rate to the coding unit 22 to terminate the process. As a result, the transmission unit 24A transmits data at the transmission rate calculated by the rate calculation unit 24.

When it is determined at Step S43 that previous state p_s is also set to 0, the process proceeds to Step S45. According to the wired congestion control technique, the rate calculation unit 24 similarly calculates a TCP friendly transmission rate using the RTT calculated at Step S41 and the packet loss rate in the control message from the reception means 24B. The rate calculation unit 24 corrects the transmission rate based on the AIMD algorithm. The rate calculation unit 24 supplies the corrected transmission rate to the coding unit 22.

When it is determined at Step S42 that control message's state s is not set to 0, the process proceeds to Step S46. The rate calculation unit 24 determines whether or not previous state p_s is also set to 0.

When it is determined at Step S46 that previous state p_s is set to 0, the process proceeds to Step S47. The rate calculation unit 24 saves (stores) the RTT calculated at the previous Step S41 and the transmission rate calculated at the previous Step S45 in the storage unit 26. That is, the rate calculation unit 24 saves the RTT and the transmission rate in the normal state (state s=1) before radio communication state s is degraded.

When it is determined at Step S46 that previous state p_s is not 0, or after the process at Step S47, the process proceeds to Step S48. The rate calculation unit 24 determines whether or not control message's state s is set to 2.

When it is determined at Step S48 that control message's state s is not 2, i.e., control message's state s is 1, the rate calculation unit 24 proceeds to Step S45. According to the wired congestion control technique, the rate calculation unit 24 calculates a transmission rate using the RTT calculated at Step S41 and the packet loss rate in the control message from the reception means 24B. The rate calculation unit 24 supplies the calculated transmission rate to the coding unit 22.

When it is determined at Step S48 that state s is 2, the process proceeds to Step S49. The rate calculation unit 25 calculates reach probability P (=1−(radio packet error rate)) based on the radio packet error rate in the control message supplied from the reception means 24B and then proceeds to Step S50.

At Step S50 the rate calculation unit 25 multiplies reach probability P by the transmission rate corresponding to the normal radio communication state saved at the most recent Step S47 to find a new transmission rate. In this manner, it is possible to calculate an available transmission rate for the degraded radio communication state.

Referring now to FIG. 8, the following describes a data transmission process for the transmitter 11 in FIG. 2 to transmit data to the receiving terminal 12.

At Step S61, the transmission unit 24A of the transmitter 11 transmits packetized data provided with sequence number i1 at a predetermined transmission rate to the receiving terminal 12 via the IP network 13 and the base station 14. At this time, the radio communication state is assumed to be normal.

At Step S80, the receiving terminal 12 performs the process at Steps S1 to S5 in FIG. 5 and the process at Steps S21 to S25 in FIG. 6 to set radio communication state s to 0 (no radio influence). The receiving terminal 12 then performs the process at Steps S7 and S8 in FIG. 5. The receiving terminal 12 transmits radio wave corresponding to the control message containing the information indicative of sequence number i1, time t1, packet loss rate p_loss_1, state s set to 0, and radio packet error rate err_r1.

After Step S61, the process proceeds to Step S62. The reception means 24B of the transmitter 11 receives the control message transmitted from the receiving terminal 12. The rate calculation unit 25 performs the process at Steps S41 to S43 and S45 in FIG. 7 and calculates transmission rate rate1 in accordance with the wired congestion control technique. The rate calculation unit 25 supplies transmission rate rate1 to the coding unit 22.

After Step S62, the process proceeds to Step S63. The transmission unit 24A transmits data at transmission rate rate1. At this time, the radio communication state is assumed to be shortly (instantaneously) degraded.

After Step S80, the process proceeds to Step S81. The receiving terminal 12 performs the process at Steps S2 to S5 in FIG. 5 and the process at Steps S21 to S24 in FIG. 6 and sets radio communication state s to 1 (determined to be shortly degraded). The receiving terminal 12 then performs the process at Steps S7 and S8 in FIG. 5. The receiving terminal 12 transmits radio wave corresponding to the control message containing the information indicative of sequence number i2, time t2, packet loss rate p_loss_2, state s set to 1, and radio packet error rate err_r2.

After Step S63, the process proceeds to Step S64. The reception means 24B of the transmitter 11 receives the control message transmitted from the receiving terminal 12. The rate calculation unit 25 performs the process at Steps S41, S42, S46, and S47 in FIG. 7 and allows the storage unit 26 to save the RTT calculated at Step S62 (Step S41 in FIG. 7) and transmission rate rate1 calculated at Step S62 (Step S45 in FIG. 7).

After Step S64, the process proceeds to Step S65. The rate calculation unit 25 performs the process at Steps S48 and 45 in FIG. 7. According to the wired congestion control technique, the rate calculation unit 25 calculates transmission rate rate2 using the RTT calculated at Step S64 (Step S41 in FIG. 7) and control message's packet loss rate p_loss_2 received at Step S64. The rate calculation unit 25 supplies transmission rate rate2 to the coding unit 22 and proceeds to Step S66.

At Step S66, the transmission unit 24A transmits data at transmission rate rate2. At this time, the radio communication state is assumed to be long (continuously) degraded.

After Step S81, the process proceeds to Step S82. The receiving terminal 12 performs the process at Steps S2 to S5 in FIG. 5 and the process at Steps S21 to S23 and S27 in FIG. 6 and sets radio communication state s to 2 (determined to be long degraded). The receiving terminal 12 then performs the process at Steps S7 and S8 in FIG. 5. The receiving terminal 12 transmits radio wave corresponding to the control message containing the information indicative of sequence number i3, time t3, packet loss rate p_loss 3, state s set to 2, and radio packet error rate err_r3.

After Step S66, the process proceeds to Step S67. The reception means 24B of the transmitter 11 receives the control message transmitted from the receiving terminal 12. The rate calculation unit 25 performs the process at Steps S41, S42, S46, and S48 to S50 in FIG. 7. Based on reach probability P, the rate calculation unit 25 multiplies transmission rate rate1 saved at Step S64 (S47 in FIG. 7) by reach probability P. The rate calculation unit 25 assumes a resulting value to be transmission rate rate3. The rate calculation unit supplies transmission rate rate3 to the coding unit 22 and proceeds to Step S68.

At Step S68, the transmission unit 24A transmits data at transmission rate rate3. At this time, the radio communication state is assumed to be restored to normal.

After Step S82, the process proceeds to Step S83. The receiving terminal 12 performs the process at Steps S2 to S6 in FIG. 5 and the process at Step S21 to S25 in FIG. 6, and then sets radio communication state s to 0 (determined to be recovered). The receiving terminal 12 then performs the process at Steps S7 and S8 in FIG. 5. The receiving terminal 12 transmits radio wave corresponding to the control message containing the information indicative of sequence number i4, time t4, packet loss rate p_loss_4, state s set to 0, and radio packet error rate err_r4.

After Step S68, the process proceeds to Step S69. The reception means 24B of the transmitter 11 receives the control message transmitted from the receiving terminal 12. The rate calculation unit 25 performs the process at Steps S41 to S43 and S44 in FIG. 7 and reads the RTT and transmission rate rate1 that are saved at Step S64 (S47 in FIG. 7) before the radio communication state degradation. The rate calculation unit 25 performs the process at S45 in FIG. 7, assumes the read transmission rate rate1 to be the new transmission rate, and supplies transmission rate rate1 to the coding unit 22.

After Step S70, the process proceeds to Step S71. The transmission unit 24A transmits data at transmission rate rate1.

For ease of explanation, FIG. 8 shows that the transmitter 11 receives the control message and then transmits data. Actually, the transmitter 11 transmits data as needed without wait for reception of the control message.

Figure 9A:
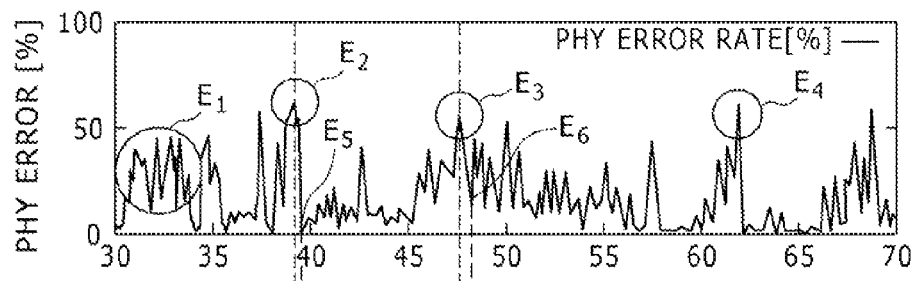
FIGS. 9A to 9C show transmission rates when the transmission system in FIG. 2 controls transmission rates under fading environment.
Figure 9B:
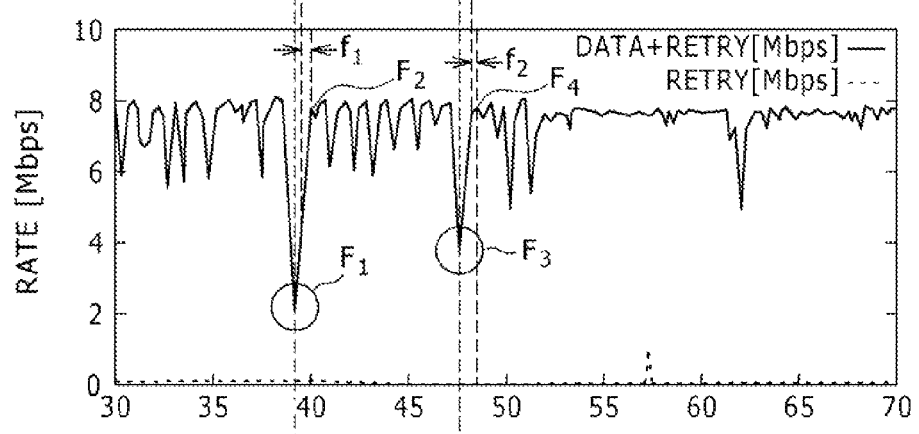
Figure 9C:
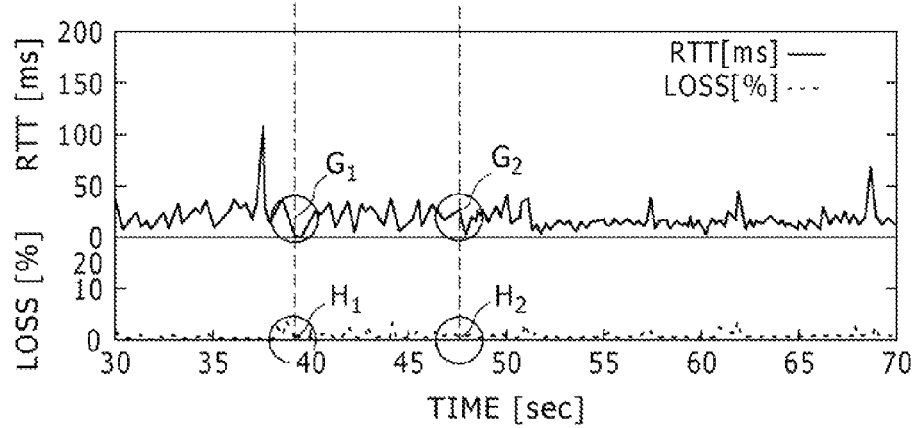

Referring now to FIGS. 9A through 9C, the following describes transmission rates controlled in the transmission system 1 in FIG. 2 under the fading environment.

FIG. 9A shows temporal changes of radio packet error rates (%). FIG. 9B shows temporal changes of transmission rates (Mbps). An upper part of FIG. 9C shows temporal changes of RTT (ms). A lower part of FIG. 9C shows temporal changes of packet loss rates (%). In FIGS. 9A through 9C, the abscissa represents time (s).

In FIG. 9A, a high radio packet error rate for one second or longer occurs approximately at the time points of 30 through 35 seconds (circle E1 in FIG. 9A), 38 through 40 seconds (circle E2 in FIG. 9A), 45 through 50 seconds (circle E3 in FIG. 9A), and 62 seconds (circle E4 in FIG. 9A). That is, long degraded states of the radio communication occur approximately at the time points of 30 through 35 seconds, 38 through 40 seconds, 45 through 50 seconds, and 62 seconds.

In this case, the rate calculation unit 25 calculates reach probability P at Step S49 in FIG. 7 based on the radio packet error rate in the control message supplied from the reception means 24B. At Step S50, the rate calculation unit 25 uses reach probability P to multiply the transmission rate saved at the most recent Step S47 before degradation of the radio communication by reach probability P to find a new transmission rate. Accordingly, the transmission rate decreases as the radio packet error rate increases. The transmission rate increases as the radio packet error rate decreases.

As shown in FIG. 9A, the long degraded state (circle E2 in FIG. 9A) of radio communication s occurs approximately at the time. In this case, as shown in FIG. 9B, the transmission rate decreases as the radio packet error rate increases. The transmission rate increases as the radio packet error rate decreases (circle E1 in FIG. 9A). When the radio communication state s is long degraded, the transmission rate is calculated based on reach probability P (throughput variation). Therefore, the rate calculation unit 25 can calculate available transmission rates in radio communication state s. As a result, the RTT and the packet loss rate decrease (circles G1 and H1 in FIG. 9C), making it possible to provide a stable transmission rate.

At the time point of approximately 40 seconds in FIG. 9A, the radio communication's long degraded state is restored to the normal state, i.e., the radio packet error rate becomes approximately 0 (point E5 in FIG. 9A). In this case, the rate calculation unit 25 assumes the transmission rate saved at Step S47 in FIG. 7 before degradation of the radio communication to be a new transmission rate as is. As a result, the transmission rate is restored to the one valid before the long degradation occurs (point F2 in FIG. 9B) approximately one second of time f1 after the radio communication's long degraded state is restored to the normal state.

As shown in FIG. 9A, the radio communication's long degraded state (E3 in FIG. 9A) occurs at the time points of 45 to 50 seconds. In this case, as shown in FIG. 9B, the transmission rate decreases as the radio packet error rate increases. The transmission rate increases as the radio packet error rate decreases (F3 in FIG. 9B). As a result, the RTT and the packet loss rate decrease (circles G2 and H2 in FIG. 9).

At the time point of approximately 48 seconds in FIG. 9A, the radio communication's long degraded state is restored to the normal state (circle E6 in FIG. 9A). In this case, the transmission rate is restored to the one valid before the long degradation occurs (point F4 in FIG. 9B) approximately shorter than one second of time f2 after the radio communication's long degraded state is restored to the normal state.

Figure 1B:
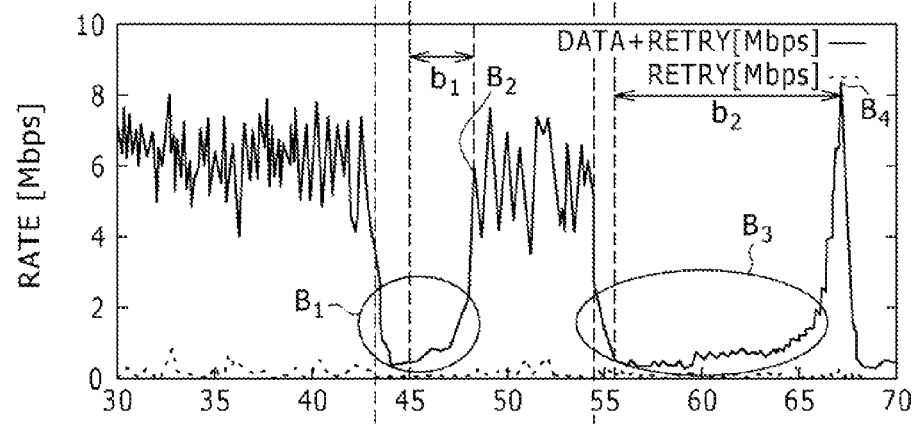
Figure 1C:
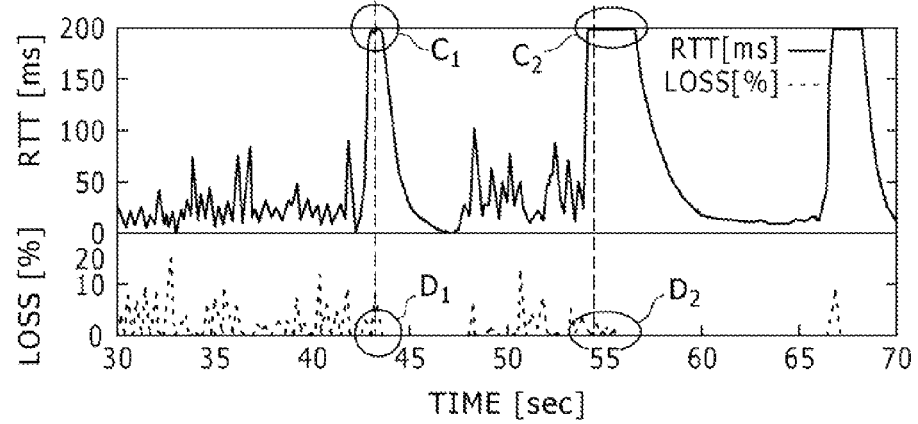

As mentioned above, the rate calculation unit 25 saves the transmission rate valid when the radio communication state is normal. When the radio communication state is restored to normal, the rate calculation unit 25 assumes that transmission rate to be a new transmission rate. In FIGS. 1A through 1C, it takes approximately two or three seconds of time b1 or approximately eight seconds of time b2 until the transmission rate recovers after the radio communication state is restored to normal. By contrast, the rate calculation unit 25 can immediately recover the transmission rate after the radio communication state is restored to normal.

As a result, the transmission system 1 in FIG. 2 shortly degrades an image corresponding to the data displayed on the output unit 45 when the transmission rate is low (e.g., circles F1 and F2 in FIG. 9B). However, no irregular framing occurs because the RTT remains low (e.g., circles G1 and G2 in FIG. 9B). In this manner, the transmission system 1 in FIG. 2 can improve the quality of images displayed on the output unit 45 by performing the transmission rate calculation process in FIG. 7.

Figure 10:
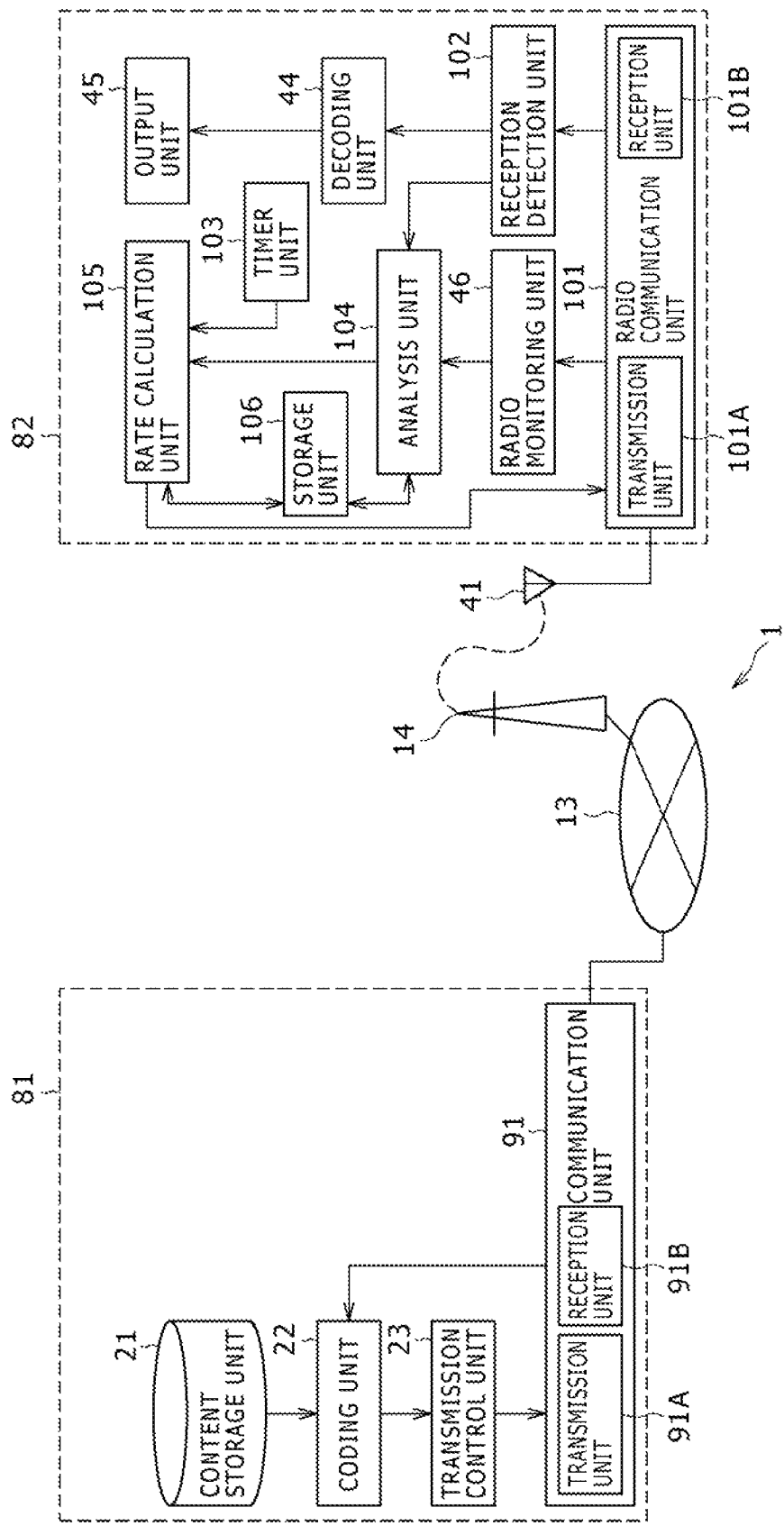
FIG. 10 shows another functional construction example of a transmission system according to an embodiment.

FIG. 10 shows another functional construction example of the transmission system 1 according to an embodiment.

The transmission system 1 in FIG. 10 is composed of the wired IP network 13, the radio base station 14, a transmitter 81, and a receiving terminal 82. Differently from the transmission system 1 in FIG. 2, the transmission system 1 in FIG. 10 uses the receiving terminal 82 to calculate a transmission rate. The receiving terminal 82 transmits this transmission rate as a control message to the transmitter 81. The mutually corresponding parts in FIGS. 10 and 2 are designated by the same reference numerals and a detailed description is omitted for simplicity. In the appended claims, data transmission means can be embodied by a transmission unit 91A in FIG. 10, for example; control information reception means can be embodied by a reception means 91B in FIG. 10, for example; control means can be embodied by a coding unit 22 in FIG. 10, for example; data reception means can be embodied by a reception means 101B in FIG. 10, for example; determination means can be embodied by an analysis unit 104 in FIG. 10, for example; generation means can be embodied by a rate calculation unit 105 in FIG. 10, for example; and control information transmission means can be embodied by a transmission unit 101A in FIG. 10, for example.

The transmitter 81 is composed of a content storage unit 21, a coding unit 22, a transmission control unit 23, and a communication unit 91.

The communication unit 91 is composed of a transmission unit 91A and a reception means 91B. Similarly to transmission unit 24A in FIG. 2, the transmission unit 91A transmits packetized data from the transmission control unit 23 via the IP network 13 and the base station 14. The reception means 91B receives a transmission rate from the receiving terminal 82. The transmission rate is received as a control message attached with a sequence number. At this time, the transmission unit 91A transmits a response message corresponding to the control message to the receiving terminal 82 by attaching the control message's sequence number to the response message.

The reception means 91B receives the transmission rate transmitted as a control message from the antenna 41 via the IP network 13 and the base station 14. The reception means 91B supplies the transmission rate to the coding unit 22.

The receiving terminal 82 is composed of the antenna 41, the decoding unit 44, an output unit 45, the radio monitoring unit 46, a radio communication unit 101, a reception detection unit 102, a timer unit 103, an analysis unit 104, a rate calculation unit 105, and a storage unit 106.

The radio communication unit 42 is composed of the transmission unit 101A and the reception means 101B. The transmission unit 101A assumes a transmission rate supplied from the rate calculation unit 105 to be the control message. The transmission unit 101A packetizes that control message and outputs radio wave corresponding to the packetized control message via the antenna 41.

The reception means 101B converts the radio wave received via the antenna 41 into data or a response message corresponding to the radio wave. The reception means 101B supplies the data to the radio monitoring unit 46 and the reception detection unit 102 and supplies the response message to the reception detection unit 102.

The reception detection unit 102 detects a packet loss rate for the overall communication channel based on the packetized data from the reception means 101B and supplies the packet loss rate to the analysis unit 47. The reception detection unit 102 acquires a sequence number attached to the packet. The reception detection unit 102 is supplied with time information indicative of the current time and acquires that time as the data reception time. The reception detection unit 102 stores the data reception time associated with its sequence number in a built-in storage unit (not shown). Further, the reception detection unit 102 supplies the sequence number to the analysis unit 104.

In addition, the reception detection unit 102 acquires not only the sequence number attached to the response message from the reception means 101B, but also the time information indicative of the current time supplied from the timer unit 103 as the time to receive the response message (hereafter referred to as a response message reception time). The reception detection unit 102 calculates the RTT based on the stored data reception time associated with the sequence number and the response message reception time and supplies the RTT to the analysis unit 104. In addition, the reception detection unit 102 supplies data from the reception means 42B to the decoding unit 44.

The timer unit 103 keeps track of the current time and supplies time information indicative of the current time to the reception detection unit 102 and the rate calculation unit 105.

Similarly to the analysis unit 47 in FIG. 2, the analysis unit 104 supplies the radio packet error rate from the radio monitoring unit 46 to the storage unit 106 for storage. The analysis unit 104 reads the radio packet error rate already stored in the storage unit 106 and determines radio communication state s based on the radio packet error rate. The analysis unit 47 supplies the rate calculation unit 105 with state s and the radio packet error rate as well as the packet loss rate, the RTT, and the sequence number from the reception detection unit 102.

The rate calculation unit 105 calculates the transmission rate based on state s, the radio packet error rate, the packet loss rate, and the RTT. Depending on needs, the rate calculation unit 105 supplies the calculated transmission rate and the RTT from the analysis unit 47 to the storage unit 104 for storage. The rate calculation unit 105 reads the transmission rate and the RTT already stored in the storage unit 104. The rate calculation unit 105 supplies the transmission unit 101A of the radio communication unit 101 with the transmission rate attached with the sequence number from the analysis unit 47 as a control message. The storage unit 106 stores the radio packet error rate from the analysis unit 104 and the transmission rate and the RTT from the rate calculation unit 105.

Figure 11:
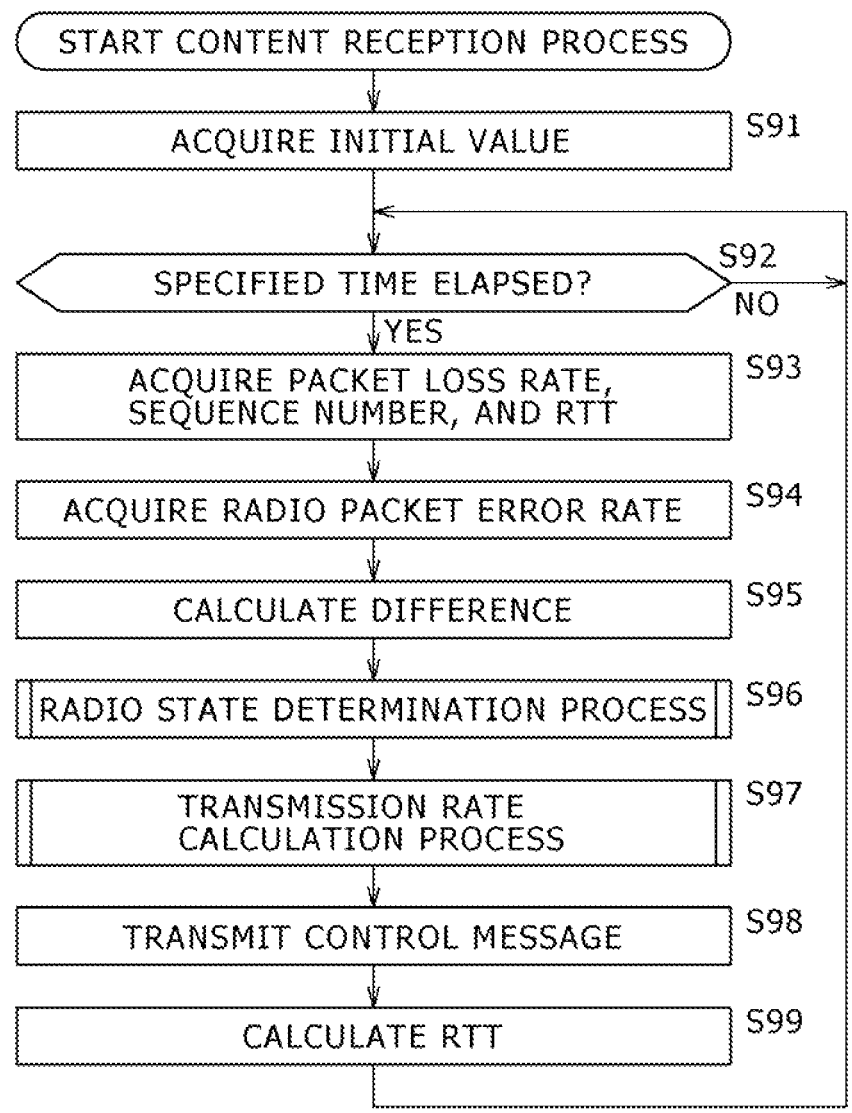
FIG. 11 is a flowchart showing a data reception process performed by a receiving terminal in FIG. 10.

Referring now to FIG. 11, the following describes a data reception process performed by the receiving terminal 82 in FIG. 10. For example, the data reception process starts when the reception means 42B receives radio wave corresponding to data from the transmission unit 24A of the transmitter 81 via the IP network 13, the base station 14, and the antenna 41.

The process at Steps S91 and S92 is the same as the process at Steps S1 and S2 in FIG. 5 and a description is omitted.

At Step S93, the reception detection unit 102 acquires the packet loss rate and the sequence number based on the packetized data supplied from the reception means 42B. The reception detection unit 102 acquires the RTT based on the response message supplied from the reception means 42B and the time information from the timer unit 103 and supplies them to the analysis unit 104.

Specifically, the reception detection unit 102 acquires the packet loss rate and the sequence number attached to the packet based on the packetized data from the reception means 42B. The reception detection unit 102 is supplied with time information indicative of the current time and acquires that time as the data reception time. The reception detection unit 102 stores the data reception time associated with its sequence number in the built-in storage unit. Further, the reception detection unit 102 supplies the packet loss rate and the sequence number to the analysis unit 104.

In addition, the reception detection unit 102 acquires not only the sequence number attached to the response message from the reception means 42B, but also the time information indicative of the current time supplied from the timer unit 103 as the response message reception time. The reception detection unit 102 calculates the RTT based on the stored data reception time associated with the sequence number and the response message reception time and supplies the RTT to the analysis unit 104.

The process at Steps S94 to S96 is the same as the process at Steps S4 to S6 in FIG. 5 and a description is omitted.

After the process at Step S96, the analysis unit 47 supplies the rate calculation unit 105 with state s determined at Step S96, the radio packet error rate supplied at Step S94, and the packet loss rate, the sequence number, and the RTT supplied at Step S93, and then proceeds to Step S97.

At Step S97, the rate calculation unit 105 performs the process similar to that at Steps S42 to S50 in FIG. 7 using state s, the radio packet error rate, the packet loss rate, and the RTT supplied from the analysis unit 47 to calculate a transmission rate.

After Step S97, the process proceeds to Step S98. The rate calculation unit 105 provides the transmission rate calculated at Step S97 with the sequence number supplied from the analysis unit 47 to create a control message and supplies the control message to the transmission unit 101A of the radio communication unit 101. The transmission unit 101A packetizes the control message and transmits radio wave corresponding to the packetized control message via the antenna 41. The process returns to Step S92.

Figure 12:
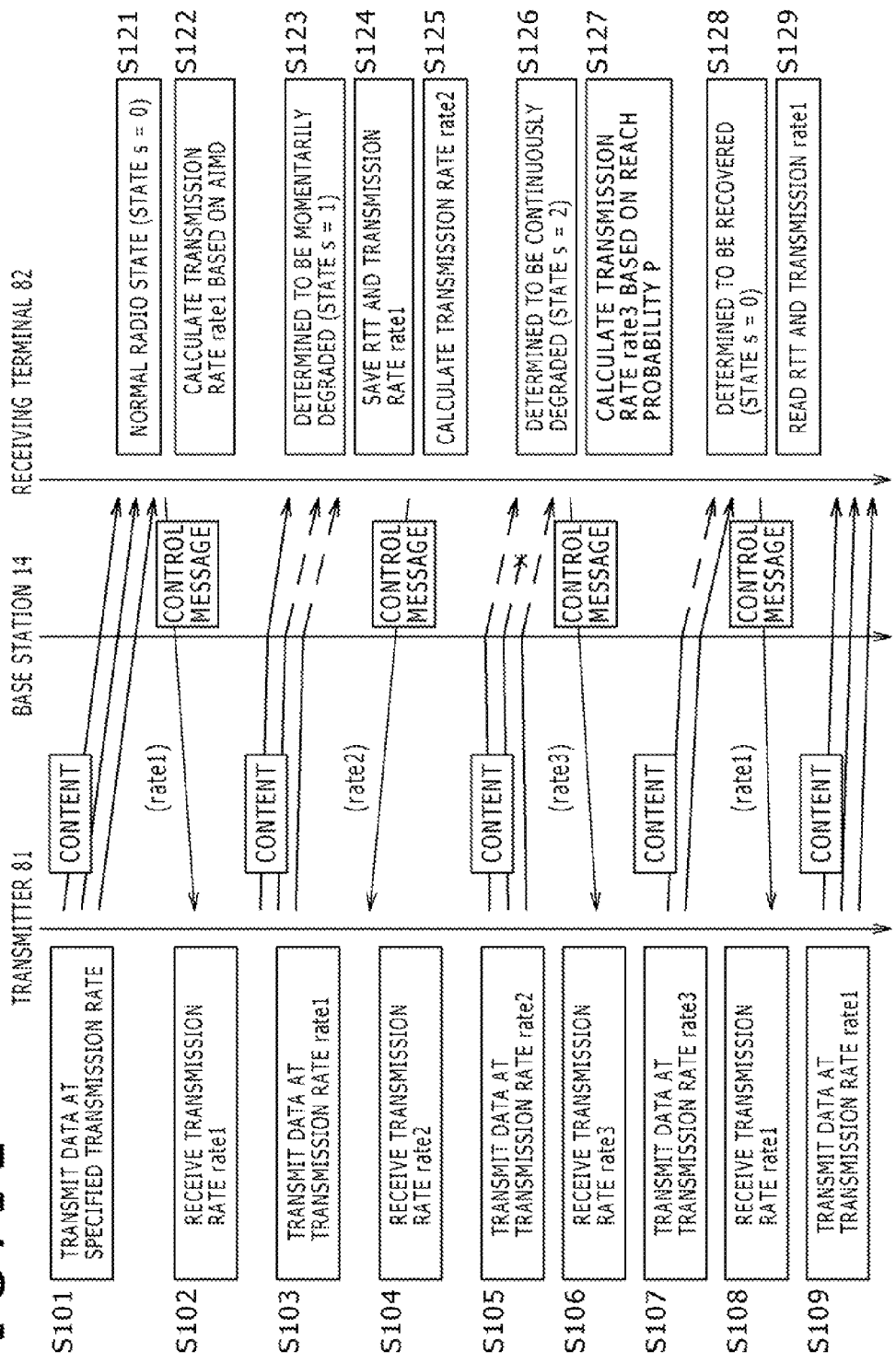
FIG. 12 shows a data transmission process in which a transmitter in FIG. 10 transmits data to the receiving terminal.

Referring now to FIG. 12, the following describes the data transmission process for the transmitter 81 in FIG. 10 to transmit data to the receiving terminal 82.

At Step S101 similarly to Step S61 in FIG. 8, the transmission unit 91A of the transmitter 81 transmits data provided with sequence number i1 at a predetermined transmission rate to the receiving terminal 82 via the IP network 13 and the base station 14. At this time, the radio communication state is assumed to be normal.

At Step S121, the receiving terminal 82 performs the process at Steps S91 to S95 in FIG. 11 and the process at Steps S21 to S25 in FIG. 6 to set radio communication state s to 0 (no radio influence), and then proceeds to Step S122. At Step S122, the rate calculation unit 105 of the receiving terminal 82 performs the process at Steps S42, S43, and S45 in FIG. 7, and calculates transmission rate rate1 according to the wired congestion control technique.

The rate calculation unit 105 performs the process at Step S98 in FIG. 11, provides transmission rate rate1 with sequence number i1 supplied from the analysis unit 104 to create a control message, and supplies it to the transmission unit 101A. The transmission unit 101A packetizes the control message and transmits radio wave corresponding to the packetized control message to the transmitter 81 via the antenna 41.

After Step S101, the process proceeds to Step S102. The reception means 91B of the transmitter 81 receives transmission rate rate1 transmitted at Step S122 as the control message from the transmission unit 101A of the receiving terminal 82 and supplies transmission rate rate1 to the coding unit 22.

At this time, the transmission unit 91A transmits a response message corresponding to the control message received by the reception means 91B by providing the response message with the sequence number attached to the control message. The response message is used for calculating the RTT in the reception detection unit 102.

After Step S102, the process proceeds to Step S103, similarly to Step S63 in FIG. 8, the transmission unit 91A transmits data at transmission rate rate1. At this time, the radio communication state is assumed to be shortly degraded.

After Step S122, the process proceeds to Step S123. The receiving terminal 12 performs the process at Steps S92 to S95 in FIG. 11 and the process at Steps S21 to S24 and S26 in FIG. 6 and sets radio communication state s to 1 (determined to be shortly degraded), and then proceeds to Step S124.

At Step S124, the rate calculation unit 105 of the receiving terminal 82 performs the process at Steps S42, S46, and S47 in FIG. 7 and allows the storage unit 26 to save the RTT acquired at Step S123 (Step S93 in FIG. 11) and transmission rate rate1 calculated at Step S122 (Step S45 in FIG. 7).

After Step S124, the process proceeds to Step S125. The rate calculation unit 105 performs the process at Steps S48 and S45 in FIG. 7. According to the wired congestion control technique, the rate calculation unit 105 calculates transmission rate rate2 using the RTT and the packet loss rate acquired at Step S123 (Step S93 in FIG. 11). The rate calculation unit 25 performs the process at Step S98. The rate calculation unit 25 provides transmission rate rate2 with the sequence number from the analysis unit 104 and transmits it as the control message to the transmission unit 101A. The transmission unit 101A packetizes the control message and transmits radio wave corresponding to the packetized control message.

After Step S103, the process proceeds to Step S104. The reception means 91B of the transmitter 81 receives the control message transmitted from the transmission unit 101A of the receiving terminal 82 and supplies the control message to the coding unit 22.

After Step S104, the process proceeds to Step S105. Similarly to Step S66 in FIG. 8, the transmission unit 91A transmits data at transmission rate rate2. At this time, the radio communication state is assumed to be long degraded.

After Step S125, the process proceeds to Step S126. The receiving terminal 12 performs the process at Steps S92 to S95 in FIG. 11 and the process at Steps S21 to S23 and S27 in FIG. 6. The receiving terminal 12 sets radio communication state s to 2 (determined to be long degraded) and then proceeds to Step S127.

At Step S127, the rate calculation unit 105 of the receiving terminal 82 performs the process at Steps S42, S46, and S48 to S50 in FIG. 7. Based on reach probability P, the rate calculation unit 105 multiplies reach probability P by transmission rate rate1 saved at Step S124 (Step S47 in FIG. 7) to find new transmission rate rate3. The rate calculation unit 25 performs the process at Step S98 in FIG. 11. The rate calculation unit 25 provides transmission rate rate3 with the sequence number from the analysis unit 104 and transmits it as the control message to the transmission unit 101A. The transmission unit 101A packetizes the control message and converts it into radio wave to transmission.

After Step S105, the process proceeds to Step S106. The reception means 91B of the transmitter 81 receives the transmission rate transmitted at Step S127 as the control message from the transmission unit 101A of the receiving terminal 82 and supplies the transmission rate to the coding unit 22.

After Step S106, the process proceeds to Step S107. Similarly to Step S68 in FIG. 8, the transmission unit 91A transmits data at transmission rate rate3. At this time, the radio communication state is assumed to be restored to normal.

After Step S127, the process proceeds to Step S128. The receiving terminal 12 performs the process at Steps S92 to S95 in FIG. 11 and the process at Steps S21 to S25 in FIG. 6. The receiving terminal 12 sets radio communication state s to 0 (determined to be recovered) and then proceeds to Step S129.

At Step S129, the rate calculation unit 105 performs the process at Steps S42 to S45 in FIG. 7. The rate calculation unit 105 reads the RTT and transmission rate rate1 that are saved at Step S124 (S47 in FIG. 7) before the radio communication state degradation and assumes rate1 to be the new transmission rate. The rate calculation unit 105 performs the process at Step S98 in FIG. 11. The rate calculation unit 105 provides transmission rate rate1 with the sequence number and transmits it as the control message to the transmission unit 101A. The transmission unit 101A packetizes the control message and transmits radio wave corresponding to the packetized control message.

After Step S107, the process proceeds to Step S108. The reception means 91B of the transmitter 81 receives transmission rate rate1 transmitted at Step S129 as the control message from the transmission unit 101A of the receiving terminal 82 and supplies the transmission rate to the coding unit 22.

After Step S108, the process proceeds to Step S109, similarly to Step S70 in FIG. 8, the transmission unit 91A transmits data at transmission rate rate1.

As mentioned above, the transmission system 1 in FIG. 10 uses the receiving terminal 82 to calculate transmission rates. It is possible for the transmitter 81 to save processing loads and the memory storage capacity. Accordingly, the transmission system 1 in FIG. 10 is preferable for a case where the transmitter 81 such as a server to deliver data simultaneously delivers (transmits) data to many receiving terminals 82.

The transmission system 1 in FIGS. 1 and 10 can be easily constructed using the existing IP network 13 and the base station 14 without adding or changing functions of the IP network 13 and the base station 14. The transmission system 1 in FIGS. 1 and 10 can be also constructed using the sophisticated base station 14 enabling the transmitter 81 and the receiving terminal 82 to exchange more detailed and realtime control messages.

When the base station 14 supplies useful parameters as the information about states specific to wired communication such as the control information, the radio monitoring unit 46 gives no limitation on the use of the parameters and the other calculation techniques.

While the embodiment calculates transmission rates using the radio packet error rate, it may be preferable to calculate a transmission rate using an average of radio packet error rates.

The transmission system 1 in FIGS. 1 and 10 may be wirelessly connected to the base station 14 instead of using the IP network 13.

Techniques for calculating The RTT for the reception detection unit 102 in FIG. 10 are not limited to the above-mentioned technique of using response messages.

As mentioned above, when radio communication state s is set to 2 to indicate the long degraded state, the transmission system 1 stores the transmission rate as the information to control the data transmission immediately before radio communication state s is set to 2. When radio communication state s is afterwards set to 0 to indicate the normal state, the transmission system 1 uses the most recently stored transmission rate to control the data transmission. When the radio communication is restored to the normal state from the degraded state, the transmission system 1 can fast recover the data transmission quality based on the transmission control state before the degradation.

In this specification, the process steps describe a program that allows a computer to perform various processes. The process steps need not be always chronologically processed in the order described in the flowchart and may include processes that are concurrently or individually (e.g., parallel processes or object-oriented processes).

The program may be processed by one computer or multiple computers in a distributed fashion. Further, the program may be transferred to a remote computer for execution.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A receiving apparatus to receive data by radio communication from a transmitting apparatus that transmits the data, the receiving apparatus comprising:
a processor;
a receiver operatively coupled to the processor;
a transmitter operatively coupled to the processor; and
a memory device storing instructions which when executed by the processor, cause the processor, in cooperation with the receiver and the transmitter, to:
receive data transmitted from the transmitting apparatus by the radio communication;
determine a radio communication state based on whether the data received by the receiver corresponds to one of a plurality of communication states;
detect radio communication information about the radio communication state based on the data;
determine the radio communication state based on a value for the detected radio communication state at a specified time and an average of values for the radio communication information detected within a specified time period including said specified time;
calculate a time difference of a control message transmission time and a data reception time; and
transmit (i) state information indicating the determined radio communication state and (ii) the calculated time difference of the control message transmission time and the data reception time to the transmitting apparatus.

2. A method for a receiving apparatus to receive data by means of radio communication from a transmitting apparatus that transmits the data, the method comprising:
receiving data transmitted from the transmitting apparatus by means of the radio communication;
determining a radio communication state based on whether the data received by a process at the data reception step corresponds to one of a plurality of communication states;
detecting radio communication information about the radio communication state based on the data;
determining the radio communication state based on a value for the detected radio communication state at a specified time and an average of values for the radio communication information detected within a specified time period including said specified time;
calculating a time difference of a control message transmission time and a data reception time; and
transmitting (i) state information indicating the radio communication state and (ii) the calculated time difference of the control message transmission time and the data reception time to the transmitting apparatus.

3. A non-transitory computer readable medium storing instructions structured to cause a computer to:
receive data transmitted from the transmitting apparatus by means of the radio communication;
determine a radio communication state based on whether the received data corresponds to one of a plurality of communication states;
detect radio communication information about the radio communication state based on the data;
determine the radio communication state based on a value for the detected radio communication state at a specified time and an average of values for the radio communication information detected within a specified time period including said specified time;
calculate a time difference of a control message transmission time and a data reception time; and
transmit (i) state information indicating the determined radio communication state and (ii) the calculated time difference of the control message transmission time and the data reception time to the transmitting apparatus.

4. A transmitting apparatus for transmitting data to a receiving apparatus by means of radio communication, the transmitting apparatus comprising:
data transmission means for transmitting the data;
control information reception means for receiving control information which is transmitted from the receiving apparatus based on a radio communication state and a calculated time difference, and is used to control transmission performed by the data transmission means, the radio communication state being determined based on whether the data transmitted to the receiving apparatus corresponds to one of a plurality of communication states; and
control means for controlling transmission performed by the data transmission means based on control information received by the control information reception means, wherein radio communication information is detected about the radio communication state based on the data, wherein the radio communication state is determined based on a value for the detected radio communication state at a specified time and an average of values for the radio communication information detected within a specified time period including said specified time, and wherein the time difference is calculated based on a difference in a control message transmission time and a data reception time.

5. A transmitting method for transmitting data from a transmitting apparatus to a receiving apparatus comprising:

transmitting the data;

receiving control information which is transmitted from the receiving apparatus based on a radio communication state and a calculated time difference, and which is used to control transmission according to a process at the data transmission step, the radio communication state being determined based on whether the data transmitted to the receiving apparatus corresponds to one of a plurality of communication states; and controlling transmission according to a process of the data transmission step based on control information received by a process at the control information reception step, wherein radio communication information is detected about the radio communication state based on the data wherein the radio communication state is determined based on a value for the detected radio communication state at a specified time and an average of values for the radio communication information detected within a specified time period including said specified time, and wherein the time difference is calculated based on a difference in a control message transmission time and a data reception time.

6. A non-transitory computer readable medium storing instructions structured to cause a computer to:

transmit data to a receiving apparatus;

receive control information which is transmitted from the receiving apparatus based on a radio communication state and a calculated time difference, and which is used to control transmission according to a process at the data transmission step, the radio communication state being determined based on whether the data transmitted to the receiving apparatus corresponds to one of a plurality of communication states; and control transmission according to a process of the data transmission step based on control information received by a process at the control information reception step, wherein radio communication information is detected about the radio communication state based on the data, wherein the radio communication state is determined based on a value for the detected radio communication state at a specified time and an average of values for the radio communication information detected within a specified time period including said specified time, and wherein the time difference is calculated based on a difference in a control message transmission time and a data reception time.

7. A receiving apparatus to receive data by radio communication from a transmitting apparatus that transmits the data, the receiving apparatus comprising:

data reception means for receiving data transmitted from the transmitting apparatus by means of radio communication;

determination means for determining a radio communication state based on whether the received data corresponds to one of a plurality of communication states;

calculation means for calculating a time difference of a control message transmission time and a data reception time; and transmission means for transmitting (i) state information indicating the determined radio communication state to the transmitting apparatus and (ii) the calculated time difference of the control message transmission time and the data reception time;

wherein radio communication information is detected about the radio communication state based on the data, wherein the radio communication state is determined based on a value for the detected radio communication state at a specified time and an average of values for the radio communication information detected within a specified time period including said specified time.

* * * * *